(12) United States Patent
Yamazaki et al.

(10) Patent No.: US 12,145,402 B2
(45) Date of Patent: Nov. 19, 2024

(54) HUB FOR HUMAN-POWERED VEHICLE

(71) Applicant: Shimano Inc., Osaka (JP)

(72) Inventors: Azusa Yamazaki, Osaka (JP);
Kazutaka Niki, Osaka (JP); Takeshi Ueda, Osaka (JP)

(73) Assignee: Shimano Inc., Osaka (JP)

( * ) Notice: Subject to any disclaimer, the term of this patent is extended or adjusted under 35 U.S.C. 154(b) by 774 days.

(21) Appl. No.: 17/221,224

(22) Filed: Apr. 2, 2021

(65) Prior Publication Data

US 2022/0314692 A1    Oct. 6, 2022

(51) Int. Cl.
| | |
|---|---|
| *B60B 27/00* | (2006.01) |
| *B60B 27/02* | (2006.01) |
| *B60B 27/04* | (2006.01) |
| *B62J 45/20* | (2020.01) |
| *B62J 45/413* | (2020.01) |
| *B62J 45/423* | (2020.01) |
| *G01D 5/245* | (2006.01) |
| *G01D 5/30* | (2006.01) |
| *H02K 7/18* | (2006.01) |

(52) U.S. Cl.
CPC ........ *B60B 27/0068* (2013.01); *B60B 27/023* (2013.01); *B60B 27/04* (2013.01); *B62J 45/20* (2020.02); *B62J 45/413* (2020.02); *B62J 45/423* (2020.02); *G01D 5/245* (2013.01); *G01D 5/30* (2013.01); *H02K 7/1846* (2013.01)

(58) Field of Classification Search
CPC ... B60B 27/0068; B60B 27/023; B60B 27/04; B62J 45/20; B62J 45/423; B62J 45/413; G01D 5/245; G01D 5/30; H02K 7/1846
See application file for complete search history.

(56) References Cited

U.S. PATENT DOCUMENTS

| | | | |
|---|---|---|---|
| 4,580,670 A * | 4/1986 | Nagano | B60B 27/023 192/64 |
| 5,065,633 A * | 11/1991 | Mercat | B62J 45/411 280/256 |
| 6,286,616 B1 | 9/2001 | Kutter | |
| 8,882,122 B2 | 11/2014 | Emura et al. | |
| 9,221,517 B2 | 12/2015 | Kitamura | |
| 2005/0285461 A1 * | 12/2005 | Kitamura | H02K 1/145 310/67 R |
| 2006/0191764 A1 | 8/2006 | Kanehisa et al. | |

(Continued)

FOREIGN PATENT DOCUMENTS

DE    10 2019 112 510 A1    11/2019

*Primary Examiner* — S. Joseph Morano
*Assistant Examiner* — Emily G. Castonguay
(74) *Attorney, Agent, or Firm* — Global IP Counselors, LLP

(57) ABSTRACT

A hub is provided for a human-powered vehicle. The hub comprises a hub axle, a hub body, a sprocket support structure, a detected part and a rotation detection sensor. The hub axle has a center axis. The hub body is rotatably disposed around the center axis. The sprocket support structure is rotatably disposed around the center axis to transmit a driving force to the hub body while rotating in a driving rotational direction around the center axis. The detected part is provided to the sprocket support structure. The rotation detection sensor is configured to detect the detected part to detect rotation of the sprocket support structure around the center axis and being disposed in the hub body.

30 Claims, 17 Drawing Sheets

(56) References Cited

U.S. PATENT DOCUMENTS

| | | | |
|---|---|---|---|
| 2014/0074348 A1* | 3/2014 | Kitamura | B62M 6/50 |
| | | | 701/33.1 |
| 2016/0137259 A1* | 5/2016 | Zhao | B62M 6/50 |
| | | | 701/22 |
| 2018/0170099 A1 | 6/2018 | Yamazaki | |
| 2021/0009232 A1* | 1/2021 | Liu | B62J 45/423 |
| 2022/0258531 A1* | 8/2022 | Piele | B60B 27/0068 |

* cited by examiner

HUB FOR HUMAN-POWERED VEHICLE

BACKGROUND

Technical Field

This disclosure generally relates to a hub for a human-powered vehicle.

Background Information

Some wheels for human-powered vehicles (e.g., bicycle) have a hub that rotatably supports a wheel. For example, the hub includes has a hub axle and a hub body rotatably disposed around the hub axle. The hub axle is non-rotatably mounted to a frame of the human-powered vehicle. The hub body is coaxially coupled to the hub axle so that the hub body is disposed radially outwardly with respect to the hub axle. The hub body is coupled to a wheel rim that supports a tire. In some cases, the hub is provided with an electric power generating device to generate electric power in accordance with the driving of the human-powered vehicle.

SUMMARY

Generally, the present disclosure is directed to various features of a hub for a human-powered vehicle. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a hub for a human-powered vehicle is provided that basically comprises a hub axle, a hub body, a sprocket support structure, a detected part and a rotation detection sensor. The hub axle has a center axis. The hub body is rotatably disposed around the center axis. The sprocket support structure is rotatably disposed around the center axis to transmit a driving force to the hub body while rotating in a driving rotational direction around the center axis. The detected part is provided to the sprocket support structure. The rotation detection sensor is configured to detect the detected part to detect rotation of the sprocket support structure around the center axis and being disposed in the hub body.

With the hub according to the first aspect, it is possible to reliable detect rotation of the sprocket support structure.

In accordance with a second aspect of the present disclosure, the hub according to the first aspect is configured so that the rotation detection sensor includes a magnetic sensor, and the detected part includes a magnet.

With the hub according to the second aspect, it is possible to inexpensively detect rotation of the sprocket support structure. In addition, the magnetic sensor can save space and has excellent environmental resistance.

In accordance with a third aspect of the present disclosure, the hub according to the second aspect further comprises a coupling body coupled to the hub body and disposed between the magnetic sensor and the detected part, the coupling body being at least partially made of a non-magnetic material or having an opening.

With the hub according to the third aspect, the magnetic sensor is protected from foreign matter such as dirt, sand or the like.

In accordance with a fourth aspect of the present disclosure, the hub according to the first aspect is configured so that the rotation detection sensor includes an optical sensor, and the detected part includes a reflective member.

With the hub according to the fourth aspect, it is possible to accurately detect rotation of the sprocket support structure.

In accordance with a fifth aspect of the present disclosure, the hub according to the fourth aspect further comprises a coupling body coupled to the hub body and disposed between the optical sensor and the detected part, the coupling body being at least partially made of a transparent material or having an opening.

With the hub according to the fifth aspect, the optical sensor is protected from foreign matter such as dirt, sand or the like.

In accordance with a sixth aspect of the present disclosure, the hub according to the first aspect is configured so that the sprocket support structure includes an outer body configured to support at least one sprocket and an inner body coupled to the hub body to rotate therewith, and the outer body is coupled to the inner body to rotate together in the driving rotational direction around the center axis, and is configured to rotate relative to the inner body in a non-driving rotational direction around the center axis.

With the hub according to the sixth aspect, the sprocket support structure functions as freewheel to allow the sprocket support structure to stop rotating during coasting.

In accordance with a seventh aspect of the present disclosure, the hub according to the sixth aspect further comprises a coupling body coupled to the hub body and the inner body, and disposed between the rotation detection sensor and the detected part.

With the hub according to the seventh aspect, the rotation detection sensor is protected from foreign matter such as dirt, sand or the like.

In accordance with an eighth aspect of the present disclosure, the hub according to any one of the first to seventh aspects is configured so that a circuit board provided in the hub body, and the rotation detection sensor being provided on the circuit board.

With the hub according to the eighth aspect, the rotation detection sensor can be conveniently provided in the hub body.

In accordance with a ninth aspect of the present disclosure, the hub according to the eighth aspect further comprises an electronic controller provided on the circuit board and configured to receive a detection signal from the rotation detection sensor.

With the hub according to the ninth aspect the detect results of the rotation detection sensor can be used to control other components.

In accordance with a tenth aspect of the present disclosure, the hub according to any one of the first to ninth aspects further comprises an electric component disposed in the hub body between the hub axle and the hub body in the radial direction with respect to the center axis.

With the hub according to the tenth aspect, the hub can be used to house an electric component in the hub body.

In accordance with an eleventh aspect of the present disclosure, the hub according to the tenth aspect is configured so that the electric component includes the rotation detection sensor.

With the hub according to the eleventh aspect, it is possible to detect rotation of the sprocket support structure.

In accordance with a twelfth aspect of the present disclosure, the hub according to the tenth or eleventh aspect further comprises an electrical cable electrically connected to the electric component and passing axially through a space between the sprocket support structure and the hub axle.

With the hub according to the twelfth aspect, the electrical cable can be electrically connected to the electric component without interfering with the rotation of the sprocket support structure or the hub body.

In accordance with a thirteenth aspect of the present disclosure, the hub according to the twelfth aspect is configured so that the hub axle includes a groove, and the electric cable is accommodated in the groove.

With the hub according to the thirteenth aspect, it is possible to easily route the electric cable along the hub axle.

In accordance with a fourteenth aspect of the present disclosure, the hub according to any one of the tenth to thirteenth aspects further comprises an electric power generator disposed in the hub body, and configured to generate electric power by rotation of the hub body. The electric component is electrically connected to the electric power generator.

With the hub according to the fourteenth aspect, it is possible to produce electric power by the rotation of the hub body and supply electrical power to the electric component.

In accordance with a fifteenth aspect of the present disclosure, the hub according to any one of the first to ninth aspects further comprises an electric power generator disposed in the hub body, and configured to generate electric power by rotation of the hub body.

With the hub according to the fifteenth aspect, it is possible to produce electric power by the rotation of the hub body.

In accordance with a sixteenth aspect of the present disclosure, the hub according to the fifteenth aspect further comprises an electrical cable electrically connected to the electric power generator and passing axially through a space between the sprocket support structure and the hub axle.

With the hub according to the sixteenth aspect, the electrical cable can be electrically connected to the electric component without interfering with the rotation of the sprocket support structure or the hub body.

In accordance with a seventeenth aspect of the present disclosure, the hub according to the fifteenth aspect is configured so that the hub axle includes a groove, and the electric cable is accommodated in the groove.

With the hub according to the seventeenth aspect, it is possible to easily route the electric cable along the hub axle.

In accordance with an eighteenth aspect of the present disclosure, a hub for a human-powered vehicle is provided that basically comprises a hub axle, a hub body, a coupling body, a sprocket support structure and a fixing member. The hub axle has a center axis. The hub body is rotatably disposed around the center axis. The coupling body includes an outer peripheral portion coupled to the hub body and an inner peripheral portion positioned radially inward of the outer peripheral portion with respect to a radial direction of the center axis. The sprocket support structure rotatably disposed around the center axis to transmit a driving force to the hub body. The sprocket support structure includes an outer body and an inner body. The outer body is configured to support at least one sprocket. The inner body is coupled to the hub body via the coupling body to rotate therewith. The outer body is coupled to the inner body to rotate together in the driving rotational direction around the center axis. The outer body is configured to rotate relative to the inner body in a non-driving rotational direction around the center axis. The fixing member is attached to the inner peripheral portion of the coupling body and attaching the inner body to the coupling body.

With the hub according to the eighteenth aspect, the hub body can be reliably coupled to the inner body of the sprocket support structure via so that the sprocket support structure functions as freewheel to allow the sprocket support structure to stop rotating during coasting.

In accordance with a nineteenth aspect of the present disclosure, the hub according to the eighteenth aspect is configured so that the fixing member is a tubular member having a first end portion abutting the inner body, and a second end portion coupled to the inner peripheral portion of the coupling body.

With the hub according to the nineteenth aspect, the inner body can be reliably coupled to the coupling body by the fixing member about the hub axle.

In accordance with a twentieth aspect of the present disclosure, the hub according to the eighteenth or nineteenth aspect is configured so that the inner peripheral portion of the coupling body is threadedly connected to the fixing member.

With the hub according to the twentieth aspect, the fixing member can be screwed to the coupling body to attach the inner body to the coupling body.

In accordance with a twenty-first aspect of the present disclosure, the hub according to any one of the eighteenth to twentieth aspects is configured so that the outer peripheral portion of the coupling body includes a first coupling structure having at least one of a spline and a groove. The hub body includes a second coupling structure having at least one of a spline and a groove. The first coupling structure mates with the second coupling structure to non-rotatably couple the coupling body to the hub body.

With the hub according to the twenty-first aspect, the coupling body can be non-rotatably coupled to the hub body with a relatively simple construction.

In accordance with a twenty-second aspect of the present disclosure, the hub according to any one of the eighteenth to twenty-first aspects is configured so that the inner body includes a third coupling structure having at least one of a spline and a groove. The coupling body includes a fourth coupling structure having at least one of a spline and a groove. The third coupling structure mates with the fourth coupling structure to non-rotatably couple the inner body to the coupling body.

With the hub according to the twenty-second aspect, the inner body can be non-rotatably coupled to the coupling body with a relatively simple construction.

In accordance with a twenty-third aspect of the present disclosure, the hub according to any one of the eighteenth to twenty-second aspects further comprises a retainer removably coupled to the hub body, and retaining the coupling body to the hub body.

With the hub according to the twenty-third aspect, the coupling body can be non-coupled to the hub body in a removable manner for servicing the hub.

In accordance with a twenty-fourth aspect of the present disclosure, the hub according to any one of the eighteenth to twenty-third aspects is configured so that the inner body is axially retained between the coupling body and a contact surface of the fixing member.

With the hub according to the twenty-fourth aspect, the inner body is prevented from axially moving with respect to the coupling body by the fixing member.

In accordance with a twenty-fifth aspect of the present disclosure, the hub according to any one of the eighteenth to twenty-fourth aspects is configured so that the fixing member has a tool engagement portion.

With the hub according to the twenty-fifth aspect, the fixing member can be easily installed.

In accordance with a twenty-sixth aspect of the present disclosure, the hub according to the twenty-fifth aspect is configured so that the fixing member has an annular inner surface that includes the tool engagement portion.

With the hub according to the twenty-sixth aspect, an axial dimension of the hub is not increased by providing the tool engagement portion on the annular inner surface of the fixing member.

In accordance with a twenty-seventh aspect of the present disclosure, the hub according to any one of the eighteenth to twenty-sixth aspects further comprises an electric component disposed in the hub body between the hub axle and the hub body in the radial direction with respect to the center axis, and an electrical cable electrically connected to the electric component and passing axially through a space between the fixing member and the hub axle.

With the hub according to the twenty-seventh aspect, the hub can be used to house an electric component in the hub body, and the electric component can be electrically connected to the electric component without interfering with the rotation of the sprocket support structure or the hub body.

In accordance with a twenty-eighth aspect of the present disclosure, the hub according to the twenty-seventh aspect is configured so that the hub axle includes a groove, and the electric cable is accommodated in the groove.

With the hub according to the twenty-eighth aspect, it is possible to easily route the electric cable along the hub axle.

In accordance with a twenty-ninth aspect of the present disclosure, the hub according to the twenty-seventh or twenty-eighth aspect further comprises an electric power generator disposed in the hub body, and configured to generate electric power by rotation of the hub body. The electric component is electrically connected to the electric power generator.

With the hub according to the twenty-ninth aspect, it is possible to produce electric power by the rotation of the hub body and supply electrical power to the electric component.

In accordance with a thirty aspect of the present disclosure, the hub according to any one of the eighteenth to twenty-sixth aspects is further comprises an electric power generator disposed in the hub body, and configured to generate electric power by rotation of the hub body.

With the hub according to the thirty aspect, it is possible to produce electric power by the rotation of the hub body.

In accordance with a thirty-first aspect of the present disclosure, the hub according to the thirty aspect further comprises an electrical cable electrically connected to the electric power generator and passing axially through a space between the fixing member and the hub axle.

With the hub according to the thirty-first aspect, the electrical cable can be electrically connected to the power generator without interfering with the rotation of the sprocket support structure or the hub body.

In accordance with a thirty-second aspect of the present disclosure, the hub according to the thirty-first aspect is configured so that the hub axle includes a groove, and the electric cable is accommodated in the groove.

With the hub according to the thirty-second aspect, it is possible to easily route the electric cable along the hub axle.

Also, other objects, features, aspects and advantages of the disclosed hub will become apparent to those skilled in the art from the following detailed description, which, taken in conjunction with the annexed drawings, discloses preferred embodiments of the hub.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
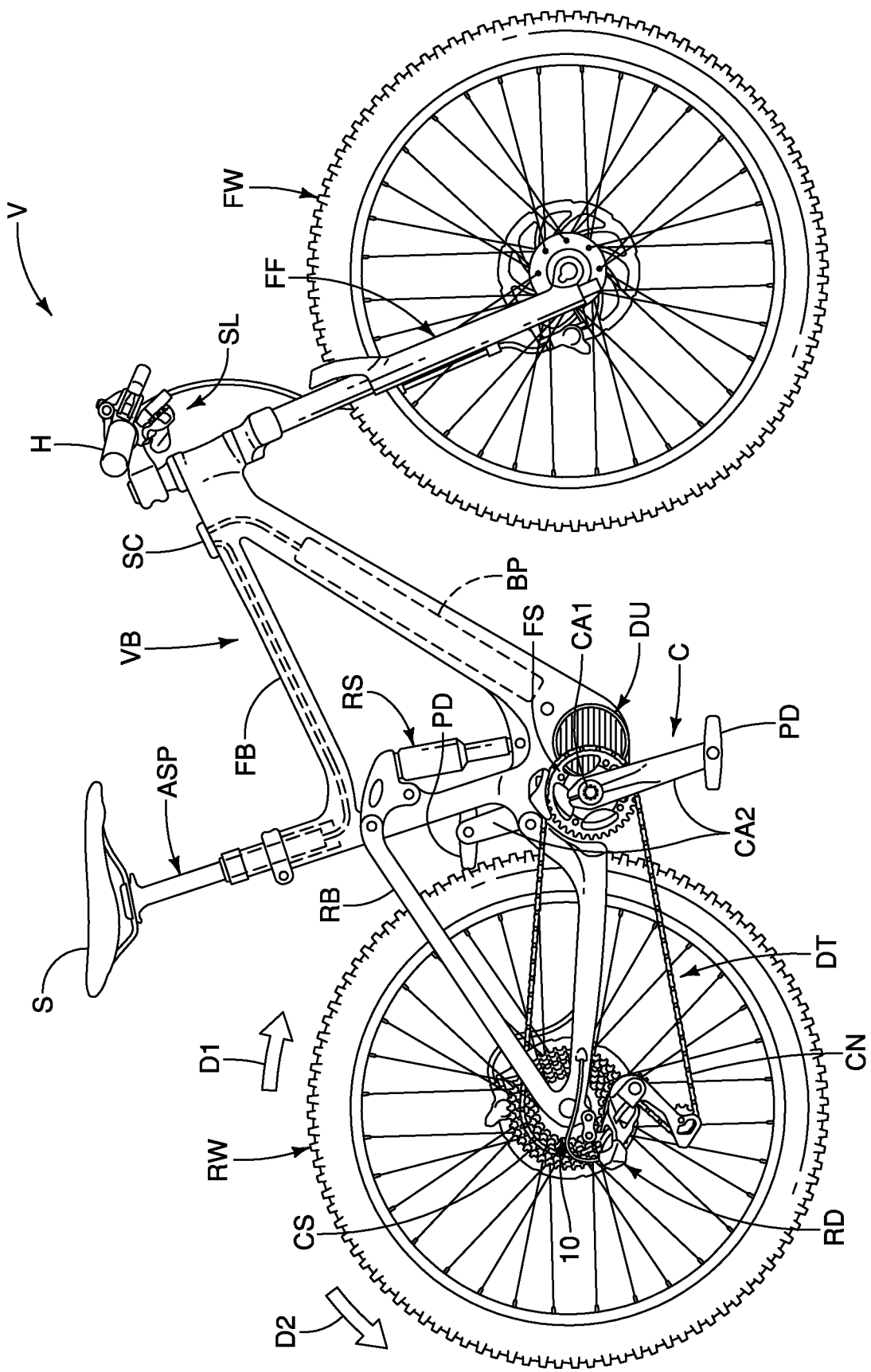
FIG. 1 is a side elevational view of a human-powered vehicle (e.g., a bicycle) equipped with a bicycle part in the form of a hub in accordance with a first embodiment.

Referring initially to FIG. 1, a hub 10 is provided for a human-powered vehicle V in accordance with one illustrated embodiment. Here, in the illustrated embodiment, the hub 10 is a hub dynamo that is provided to the human-powered vehicle V for providing electric power to one or more components of the human-powered vehicle V. However, the hub 10 is not limited to a hub dynamo. In particular, certain aspects of the hub 10 can be provided to a hub that does not generate electric power. Also, while the hub 10 is illustrated as a rear hub, certain aspects of the hub 10 can be provided to a front hub. Thus, the hub 10 is not limited to a rear hub.

Here, the human-powered vehicle V is an electric assist bicycle (E-bike). Alternatively, the human-powered vehicle V can be a road bicycle, a city bike, a cargo bike, and a recumbent bike, or another type of off-road bicycle such as a cyclocross bicycle. The number of wheels on the human-powered vehicle V is not limited. The human-powered vehicle V includes, for example, a monocycle and a vehicle having three or more wheels. Here, the human-powered vehicle V is a bicycle that at least partially uses human power as a driving power for traveling and includes an electric drive unit assisting the human power. In particular, a vehicle using solely an internal combustion engine as driving power is not included in the human-powered vehicle of this disclosure. In any case, in the illustrated embodiment, the hub 10 is one example of a bicycle part.

As seen in FIG. 1, the human-powered vehicle V includes a vehicle body VB that is supported by a rear wheel RW and a front wheel FW. The vehicle body VB basically includes a front frame body FB and a rear frame body RB (a swing arm). The vehicle body VB is also provided with a handlebar H and a front fork FF for steering the front wheel FW. The rear frame body RB is swingably mounted to a rear section of the front frame body FB such that the rear frame body RB can pivot with respect to the front frame body FB. The rear wheel RW is mounted to a rear end of the rear frame body RB. A rear shock absorber RS is operatively disposed between the front frame body FB and rear frame body RB. The rear shock absorber RS is provided between the front frame body FB and the rear frame body RB to control the movement of the rear frame body RB with respect to the front frame body FB. Namely, the rear shock absorber RS absorbs shock transmitted from the rear wheel RW. The rear wheel RW is rotatably mounted to the rear frame body RB.

The front wheel FW is mounted to the front frame body FB via the front fork FF. Namely, the front wheel FW is mounted to a lower end of the front fork FF. A height adjustable seatpost ASP is mounted to a seat tube of the front frame body FB in a conventional manner and supports a bicycle seat or saddle S in any suitable manner. The front fork FF is pivotally mounted to a head tube of the front frame body FB. The handlebar H is mounted to an upper end of a steering column steerer tube of the front fork FF. The front fork FF absorbs shock transmitted from the front wheel FW. Preferably, the rear shock absorber RS and the front fork FF are electrically adjustable suspensions. For example, the stiffness and/or stoke length of the rear shock absorber RS and the front fork FF can be adjusted.

The human-powered vehicle V further includes a drivetrain DT and an electric drive unit DU that is operatively coupled to the drivetrain DT. Here, for example, the drivetrain DT is a chain-drive type that includes a crank C, a front sprocket FS, a plurality of rear sprockets CS and a chain CN. The crank C includes a crank axle CA1 and a pair of crank arms CA2. The crank axle CA1 is rotatably supported to the front frame body FB via the electric drive unit DU. The crank arms CA2 are provided on opposite ends of the crank axle CAL A pedal PD is rotatably coupled to the distal end of each of the crank arms CA2. The drivetrain DT can be selected from any type, and can be a belt-drive type or a shaft-drive type.

The electric drive unit DU has an electric motor that provides a drive assist force to the front sprocket FS. The electric drive unit DU can be actuated to assist in the propulsion of the human-powered vehicle V in a conventional manner. The electric drive unit DU is actuated, for example, in accordance with a human driving force applied to the pedals PD. The electric drive unit DU is actuated by electric power supplied from a main battery pack BP that is mounted on a downtube of the human-powered vehicle V. The main battery pack BP can provide electrical power to other vehicle components such as the rear derailleur RD, the height adjustable seatpost ASP, the rear shock absorber RS, the front fork FF and any other vehicle component that uses electrical power.

The human-powered vehicle V further includes a cycle computer SC. Here, the cycle computer SC is mounted to the front frame body FB. Alternatively, the cycle computer SC can be provided on the handlebar H. The cycle computer SC notifies the rider of various traveling and/or operating conditions of the human-powered vehicle V. The cycle computer SC can also include various control programs for automatically controlling one or more vehicle components. For example, the cycle computer SC can be provided with an automatic shifting program for changing gears of the rear derailleur RD based on one or more traveling and/or operating conditions of the human-powered vehicle V.

Here, the human-powered vehicle V further includes a rear derailleur RD that is attached to the rear frame body RB for shifting the chain CN between the rear sprockets CS. The rear derailleur RD is one type of gear changing device. Here, the rear derailleur RD is an electric derailleur (i.e., an electric gear changing device or an electric transmission device). Here, the rear derailleur RD is provided on the rear side of the rear frame body RB near the hub 10. The rear derailleur RD can be operated when a rider of the human-powered vehicle V manually operates a gear shift operating device or shifter SL. The rear derailleur RD can also be automatically operated based on traveling conditions and/or operating conditions of the human-powered vehicle V. The human-powered vehicle V can further include a plurality of electronic components. Some or all of the electronic components can be supplied with electric power generated by the hub 10 during a power generation state as discussed herein.

The structure of the hub 10 will now be described with particular reference to FIGS. 2 to 5. The hub 10 basically comprises a hub axle 12 and a hub body 14. The hub axle 12 has a center axis A1. The hub axle 12 is configured to be non-rotatably attached to the vehicle body VB. The hub axle 12 is configured to be non-rotatably attached to the rear frame body RB. The hub body 14 is rotatably disposed around the center axis A1. In other words, the hub body 14 is rotatably mounted around the hub axle 12.

Figure 2:
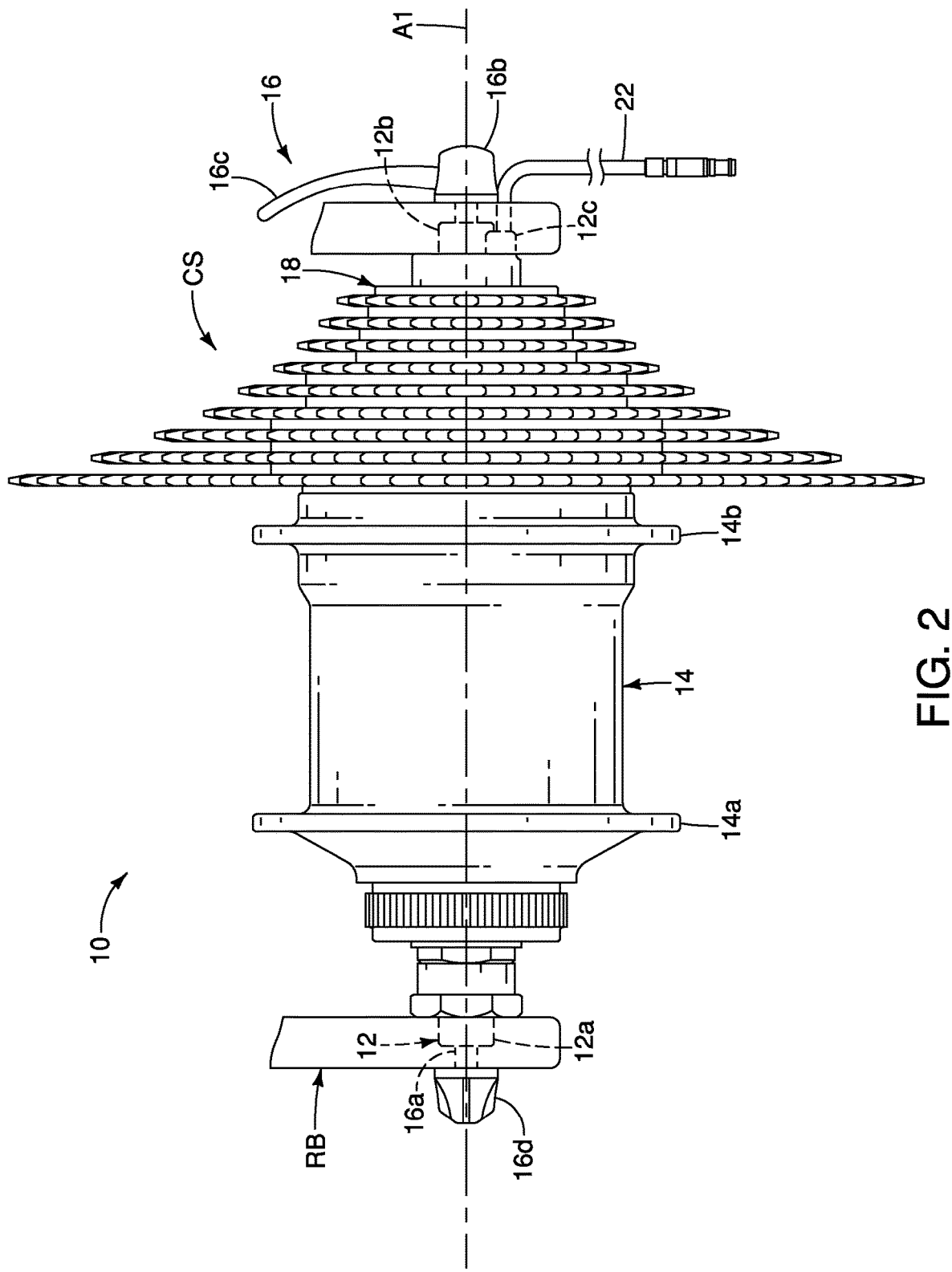
FIG. 2 is a longitudinal elevational view of the hub attached to the vehicle body of the human-powered vehicle illustrated in FIG. 1.
Figure 3:
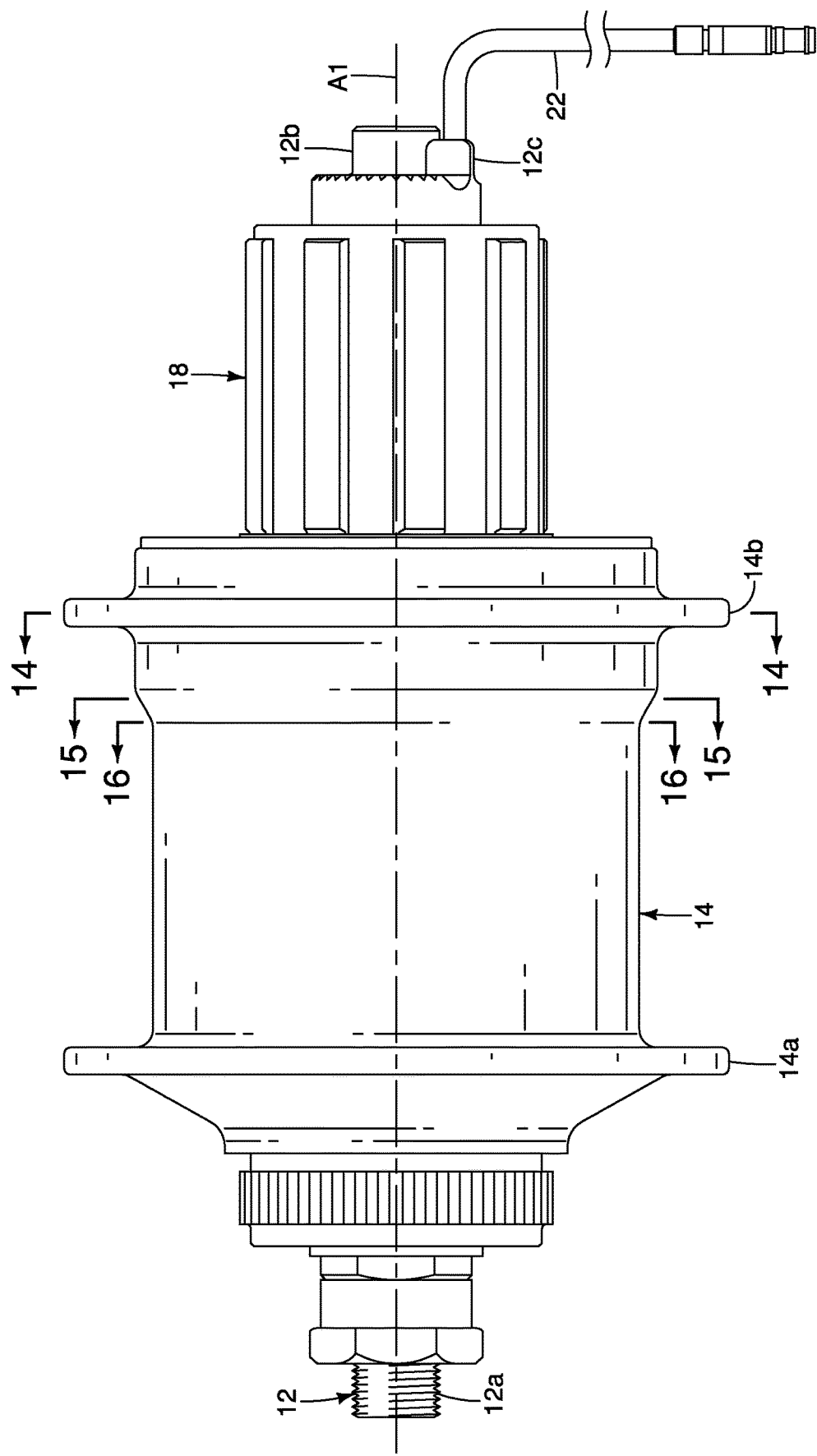
FIG. 3 is a longitudinal elevational view of the hub illustrated in FIG. 2 with the rear sprockets removed.
Figure 4:
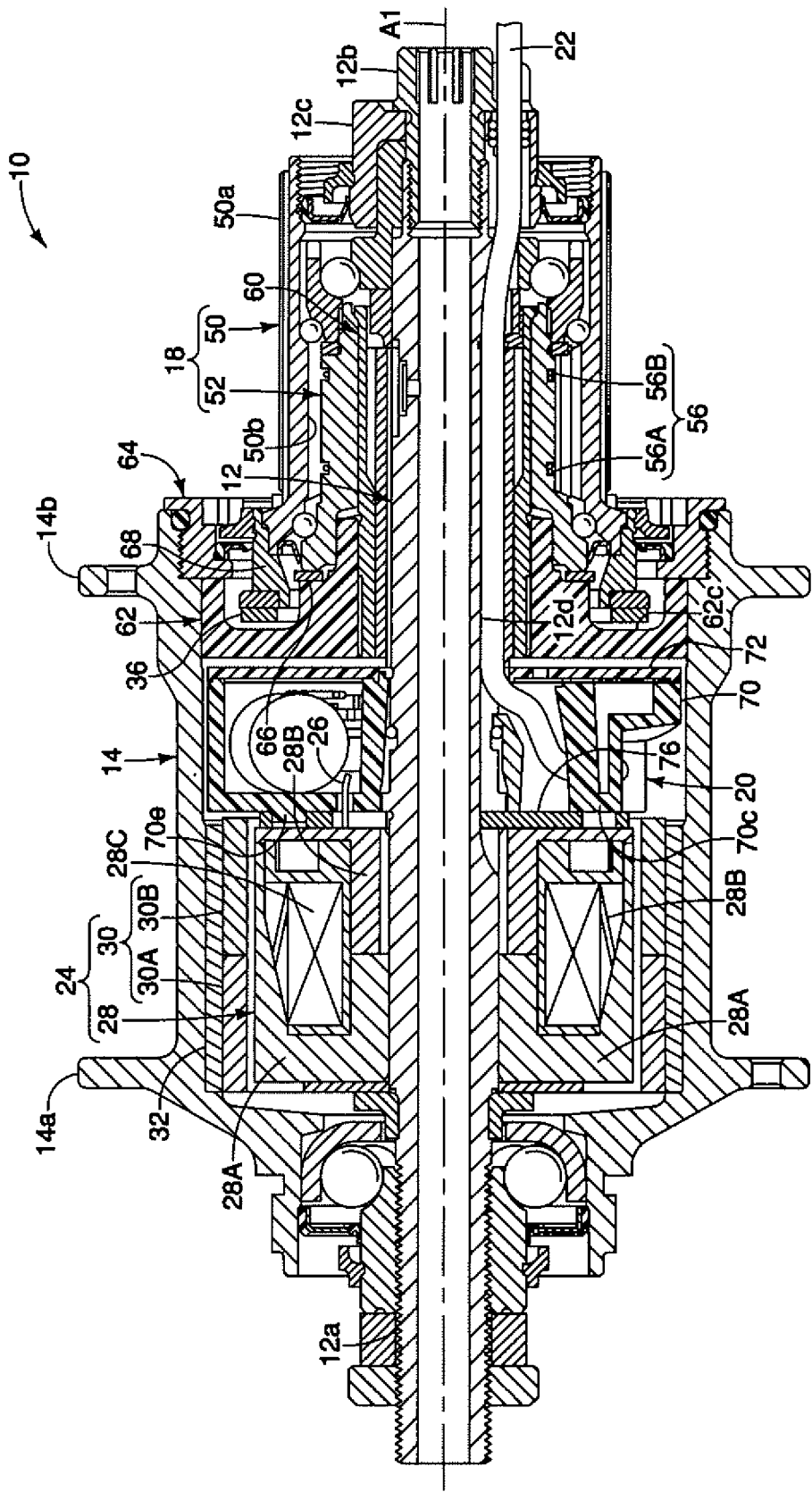
FIG. 4 is a longitudinal cross-sectional view of the hub illustrated in FIGS. 2 and 3.

As seen in FIGS. 2 to 4, the hub axle 12 is a rigid member made of a suitable material such as a metallic material. Here, the hub axle 12 is a tubular member. The hub axle 12 can be a one-piece member or made of several pieces. Here, the hub axle 12 includes a main body 12a and an end piece 12b. The end piece 12b is threadedly mounted to a first end (right side in FIGS. 2 to 4) of the main body 12a. In this way, the second end (left side in FIGS. 2 to 4) of the main body 12a and the end piece 12b are receiving in mounting openings of the rear frame body RB as seen in FIG. 2. The second end of the main body 12a and the end piece 12b are receiving in mounting openings of the vehicle body VB. Here, the hub axle 12 further includes a rotation restriction member 12c which is coupled to the main body 12a by the end piece 12b. The rotation restriction member 12c engages the vehicle body VB. The rotation restriction member 12c engages the rear frame body RB so that rotation of the hub axle 12 relative to the rear frame body RB is restricted.

Here, as seen in FIG. 2, the hub 10 further comprises a wheel holding mechanism 16 for securing the hub axle 12 of the hub 10 to the rear frame body RB. The wheel holding mechanism 16 basically includes a shaft or skewer 16a, a cam body 16b, a cam lever 16c and an adjusting nut 16d. The cam lever 16c is attached to one end of the skewer 16a via the cam body 16b, while the adjusting nut 16d is threaded on the other end of the skewer 16a. The lever 16c is attached to the cam body 16b. The cam body 16b is coupled between the skewer 16a and the lever 16c to move the skewer 16a relative to the cam body 16b. Thus, the lever 16c is operated to move the skewer 16a in the axial direction of the center axis A1 with respect to the cam body 16b to change the distance between the cam body 16b and the adjusting nut 16d. Preferably, a compression spring is provided at each end of the skewer 16a. Alternatively, the hub axle 12 can be non-rotatably attached to the rear frame body RB with other attachment structures as needed and/or desired.

Figure 5:
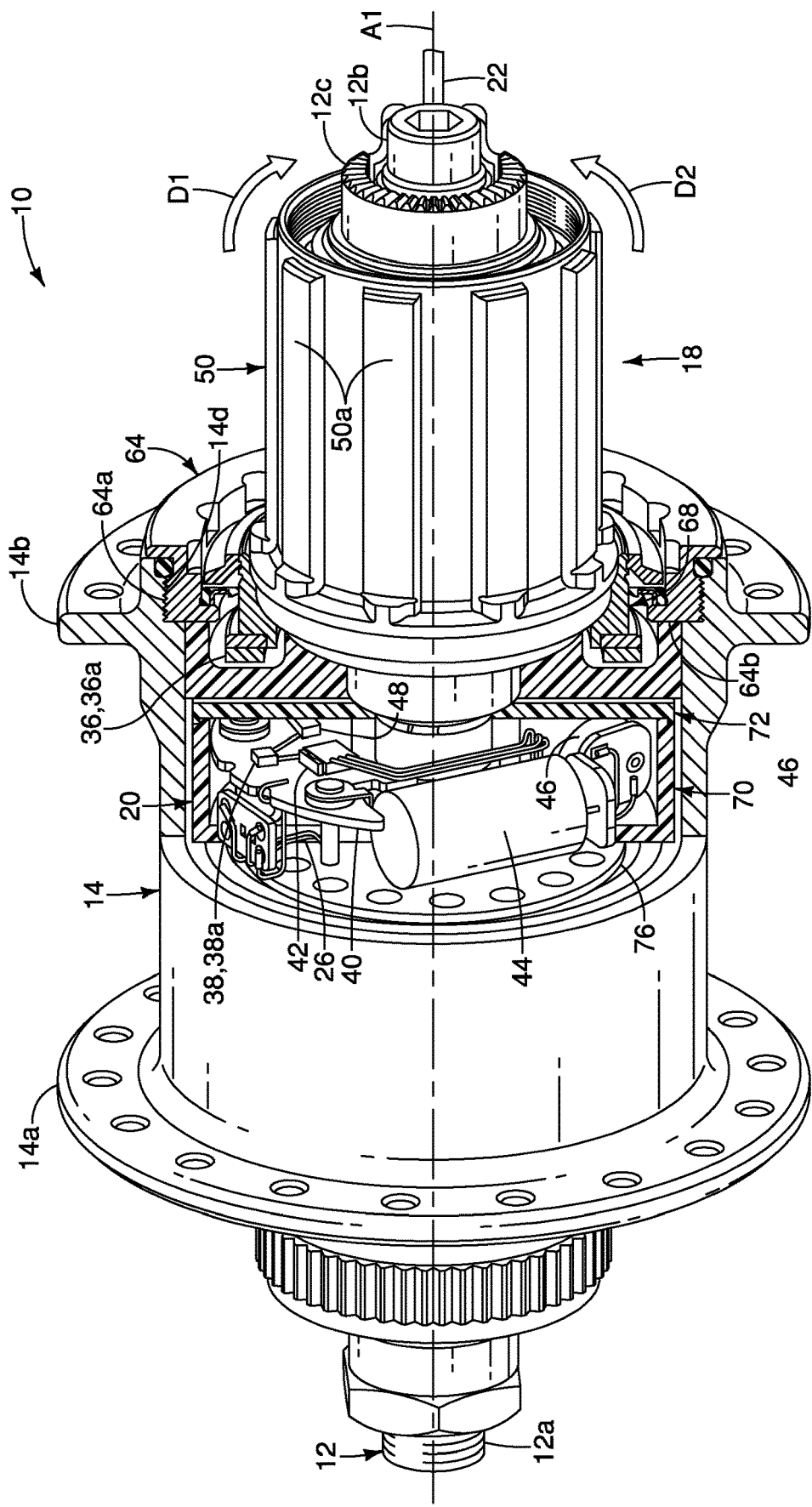
FIG. 5 is a perspective view of the hub illustrated in FIGS. 2 to 4 with portions broken way to show an electrical unit having a rotation detection sensor and a magnet provided to a sprocket support structure for detecting rotation of the sprocket support structure.
Figure 6:
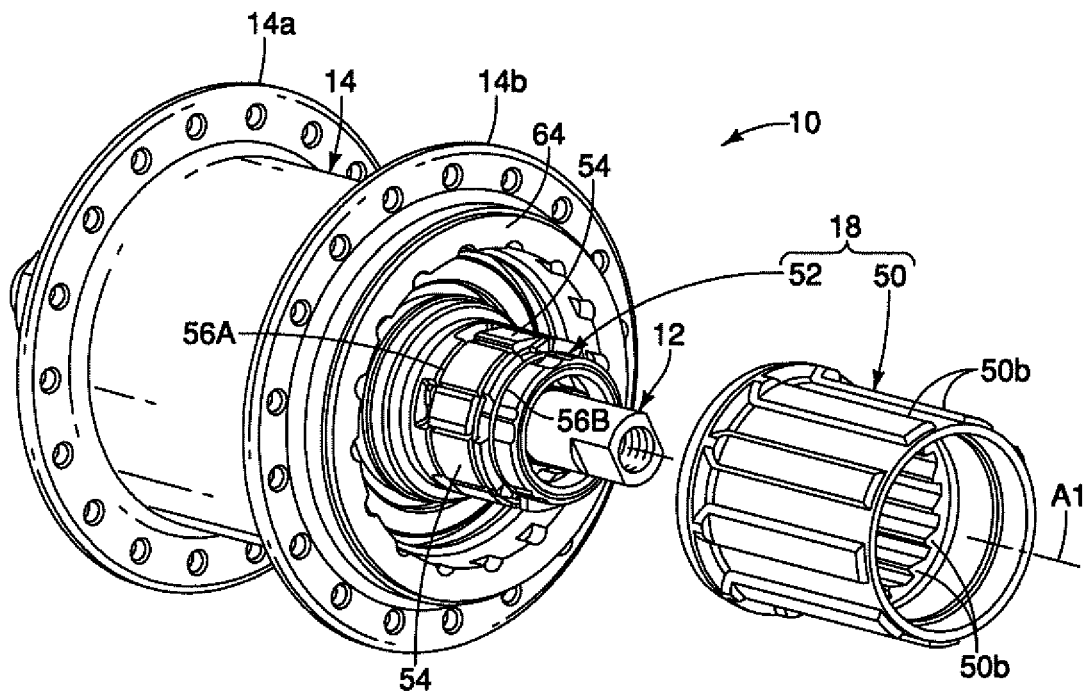
FIG. 6 is a partially exploded perspective view of the hub illustrated in FIGS. 2 to 5 after an outer body of the sprocket support structure has been detached.

As indicated in FIGS. 1 and 5, the hub body 14 is rotatably mounted around the hub axle 12 to rotate in a driving rotational direction D1. The driving rotational direction D1 corresponds to a forward driving direction of the rear wheel RW. The hub body 14 is configured to support the rear wheel RW in a conventional manner. More specifically, in the illustrated embodiment, the hub body 14 includes a first outer flange 14a and a second outer flange 14b. The first outer flange 14a and the second outer flange 14b extend radially outward with respect to the center axis A1. The first outer flange 14a and the second outer flange 14b are configured to receive a plurality of spokes (FIG. 1) for attaching a rim (FIG. 1) of the rear wheel RW to the hub body 14. In this way, the hub body 14 and the rear wheel RW are coupled to rotate together about the central axis A1.

Here, the hub 10 further comprises a sprocket support structure 18. In the illustrated embodiment, the sprocket support structure 18 supports the rear sprockets CS as seen in FIG. 2. The sprocket support structure 18 is rotatably disposed around the center axis A1 to transmit a driving force to the hub body 14. In particular, the sprocket support structure 18 transmits a driving force to the hub body 14 while rotating in the driving rotational direction D1 around the center axis A1. As explained below, the sprocket support structure 18 does not transmit a driving force to the hub body 14 while rotating in a non-driving rotational direction D2 around the center axis A1. The non-driving rotational direction D2 is opposite to the driving rotational direction D1 with respect to the center axis A1. The center rotational axis of the sprocket support structure 18 is disposed concentrically with the center axis A1 of the hub axle 12.

While the sprocket support structure 18 is configured to non-rotatably support the rear sprockets CS, the sprocket support structure 18 is not limited to the illustrated embodiment. Alternatively, one or more of the rear sprockets CS can be integrally formed with the sprocket support structure 18. In any case, the sprocket support structure 18 and the rear sprockets CS are coupled together to rotate together in both the first rotational direction D1 and the second rotational direction D2.

As seen in FIGS. 4 and 5, the hub 10 further comprises an electric component 20 that is disposed in the hub body 14 between the hub axle 12 and the hub body 14 in the radial direction with respect to the center axis A1. Here, the electric component 20 is provided in an electrical unit EU that is non-rotatable relative to the hub axle 12. Thus, the electric component 20 remains stationary as the hub body 14 rotates relative to the hub axle 12. The hub 10 further comprises an electrical cable 22 that is electrically connected to the electric component 20. The electrical cable 22 passes axially through a space between the sprocket support structure 18 and the hub axle 12. Specifically, in the illustrated embodiment, the hub axle 12 includes a groove 12d. In this way, the electric cable 22 is accommodated in the groove 12d. The electric cable 22 extends out of the hub 10 and is electrically connected to another electrical component of the human-powered vehicle V such as the rear derailleur RD, the battery pack BP or an electrical junction. As explain later, the electric cable 22 can provide electric power generated by the hub 10 to the rear derailleur RD, the battery pack BP or another electrical component.

As seen in FIG. 4, the hub 10 further comprises an electric power generator 24 that is disposed in the hub body 14. More specifically, the electric power generator 24 is disposed in the hub body 14 between the hub axle 12 and a center portion of the hub body 14. The electric power generator 24 is configured to generate electric power by rotation of the hub body 14. The electric component 20 is electrically connected to the electric power generator 24. The hub 10 further comprises an electrical cable 26 that is electrically connected to the electric power generator 24. The electrical cable 26 is also electrically connected to the electric component 20. In this way, the electrical cable 26 electrically connects the electric component 20 to the electric power generator 24 so that the electric component 20 can receive electric power from the electric power generator 24. The electrical cable 26 is also electrically connected to the electrical cable 22 that passes axially through a space between the sprocket support structure 18 and the hub axle 12.

The electric power generator 24 basically includes an armature 28 (i.e., a stator in the illustrated embodiment) and a magnet 30 (i.e., a rotor in the illustrated embodiment). While the armature 28 is illustrated as being fixed with respect to the hub axle 12 and the magnet 30 is illustrated as being fixed with respect to the hub body 14, the armature 28 can be fixed with respect to the hub body 14 and the magnet 30 can be fixed with respect to the hub axle 12. The armature 28 includes a first yoke 28A, a second yoke 28B and a coil 28C. The first yoke 28A includes two or more first yoke pieces that are arranged in the circumferential direction of the hub axle 12. Likewise, the second yoke 28B includes two or more second yoke pieces that are arranged in the circumferential direction of the hub axle 12 and that alternate with the first yoke pieces of the first yoke 28A. The coil 28C is located between the first yoke 28A and the second yoke 28B. The magnet 30 includes a plurality of first magnet parts 30A and a plurality of second magnet parts 30B arranged inside a tubular support 32. The tubular support 32 fixedly coupled to the inside of the hub body 14 so that the magnet 30 and the hub body 14 rotate together around the hub axle 12. The first magnet parts 30A and the second magnet parts 30B are arranged so that S-poles and N-poles of the first magnet parts 30A and the second magnet parts 30B are alternately arranged in the circumferential direction of the hub axle 12. Therefore, the S-poles of the first magnet parts 30A are not aligned with the S-poles of the second magnet parts 30B, and the N-poles of the first magnet parts 30A are not aligned with the N-poles of the second magnet parts 30B in the axial direction of the shaft member 12.

In the illustrated embodiment, the hub 10 further comprises a detected part 36 and a rotation detection sensor 38. Here, the detected part 36 is provided to the sprocket support structure 18. On the other hand, the rotation detection sensor 38 is disposed in the hub body 14. Specifically, here, the electric component 20 includes the rotation detection sensor 38. More specifically, the hub 10 further comprises a circuit board 40 that is provided in the hub body 14. The circuit board 40 is located inside the electrical unit EU. The rotation detection sensor 38 is provided on the circuit board 40. In this way, the circuit board 40 and the rotation detection sensor 38 are non-rotatable with respect to the hub axle 12. As seen in FIG. 5, the rotation detection sensor 38 is disposed in the hub body 14 at a location spaced radially outward from the hub axle 12.

In the illustrated embodiment, the rotation detection sensor 38 includes a magnetic sensor 38a, and the detected part 36 includes a magnet 36a. Thus, the magnetic sensor 38a detects movement of the magnet 36a, which rotates together with the sprocket support structure 18. In other words, with this arrangement, the rotation detection sensor 38 is configured to detect the detected part 36 to detect rotation of the sprocket support structure 18 around the center axis A1. Here, the magnet 36a of the detected part 36 is an annular member with alternating S-pole sections and N-pole sections. In this way, the magnetic sensor 38a can detect a rotational amount and a rotational direction of the sprocket support structure 18. The term "sensor" as used herein refers to a hardware device or instrument designed to detect the presence or absence of a particular event, object, substance, or a change in its environment, and to emit a signal in response. The term "sensor" as used herein do not include a human. The rotation detection sensor 38 receives electric power from the electric power generator 24 as discussed below.

The hub 10 further comprises an electronic controller 42 that provided on the circuit board 40. The electronic controller 42 is configured to receive a detection signal from the rotation detection sensor 38. The electronic controller 42 includes at least one processor that executes predetermined control programs. The at least one processor can be, for example, a central processing unit (CPU) or a micro processing unit (MPU). The term "electronic controller" as used herein refers to hardware that executes a software program, and does not include a human. The electronic controller 42 receives electric power from the electric power generator 24. The electronic controller 42 is configured to control the electric power generated by the electric power generator 24. Here, the electric component 20 includes a first electric power storage device 44 and a second electric power storage device 46. The electronic controller 42 is configured to control the storage of the electric power generated by the electric power generator 24 in the first electric power storage device 44 and the second electric power storage device 46. The first electric power storage device 44 and the second electric power storage device 46 are conventional electric power storage device such a rechargeable battery, a capacitor, etc. The electronic controller 42 is configured to control the distribution of the electric power stored in the first electric power storage device 44 and the second electric power storage device 46 to other components. Thus, the electric power generated by the electric power generator 24 can be stored and/or supplied directly to other components such as the rotation detection sensor 38, the rear derailleur RD, etc.

Preferably, as seen in FIG. 5, the hub 10 further comprises a data storage device 48 that provided on the circuit board 40. The data storage device 48 stores various control programs and information used for various control processes including power generation control, power storage control, hub rotation detection control, etc. The data storage device 48 includes any computer storage device or any non-transitory computer-readable medium with the sole exception of a transitory propagating signal. For example, the data storage device 48 includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

Now referring to FIGS. 4 and 6 to 8, the sprocket support structure 18 will be discussed in more detail. The sprocket support structure 18 basically includes an outer body 50 and an inner body 52. The outer body 50 and the inner body 52 are tubular members that are coaxially arranged about the hub axle 12. The outer body 50 is configured to support at least one sprocket CS. Here, the outer body 50 has a plurality axially extending splines 50a provided on its outer peripheral surface for non-rotatably supporting the sprocket CS. The outer body 50 has also has a plurality of axially extending ratchet teeth 50b provided on its inner peripheral surface, which forms a first part of a one-way clutch. As explained below, the inner body 52 is coupled to the hub body 14 to rotate therewith.

The sprocket support structure 18 further includes a plurality of pawls 54 and a biasing element 56. The plurality of pawls 54 and the biasing element 56 form a second part of a one-way clutch. The pawls 54 are retained to the inner body 52 by the biasing element 56 such that the pawls 54 are biased towards engagement with the ratchet teeth 50b of the sprocket support structure 18. More specifically, here, the biasing element 56 includes a pair of split rings 56A and 56B in which the end portions of each split rings 56A and 56B overlap. The biasing element 56 is installed around the inner body 52 with the pawls 54 disposed between the biasing element 56 and the inner body 52. The biasing element 56 squeezes the pawls 54 against the inner body 52 such that the pawls 54 pivot towards engagement with the ratchet teeth 50b of the sprocket support structure 18. In this way, the outer body 50 is coupled to the inner body 52 to rotate together in the driving rotational direction D1 around the center axis A1. Also, when the outer body 50 is rotated in the non-driving rotational direction D2, the ratchet teeth 50b of the sprocket support structure 18 push the pawls 54 and pivot the pawls 54 to a retracted position against the inner body 52. Thus, the outer body 50 is configured to rotate relative to the inner body 52 in the non-driving rotational direction D2 around the center axis A1. In this way, the outer body 50, the inner body 52, the pawls 54 and the biasing element 56 form a freewheel that is commonly used in bicycles. Since the basic operation of the freewheel is relatively conventional, the freewheel will not be discussed or illustrated in further detail.

Figure 7:
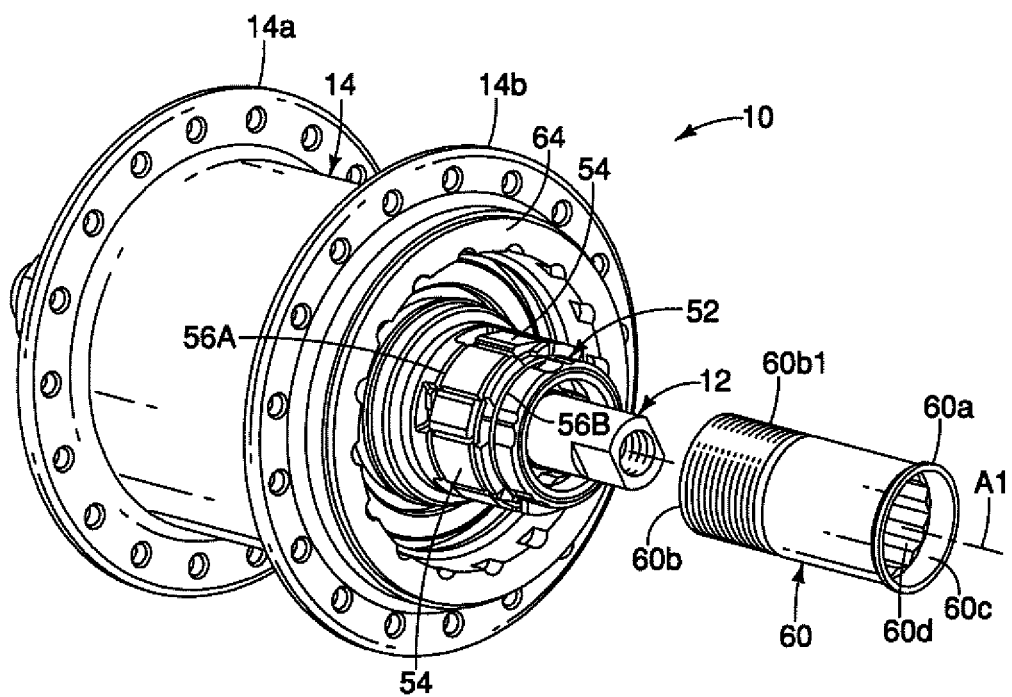
FIG. 7 is a partially exploded perspective view of the hub illustrated in FIGS. 2 to 5 after a fixing member has been detached so that an inner body of the sprocket support structure can be removed.
Figure 8:
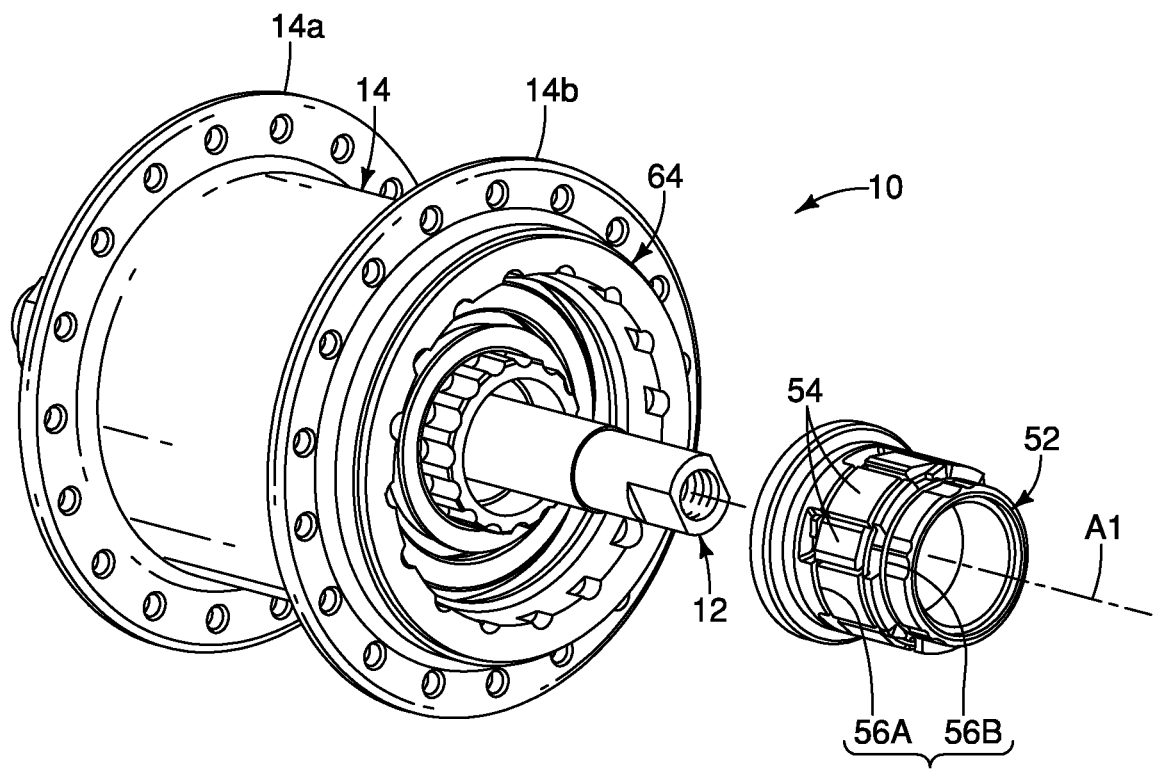
FIG. 8 is a partially exploded perspective view of the hub illustrated in FIGS. 2 to 5 after the inner body of the sprocket support structure has been detached.
Figure 9:
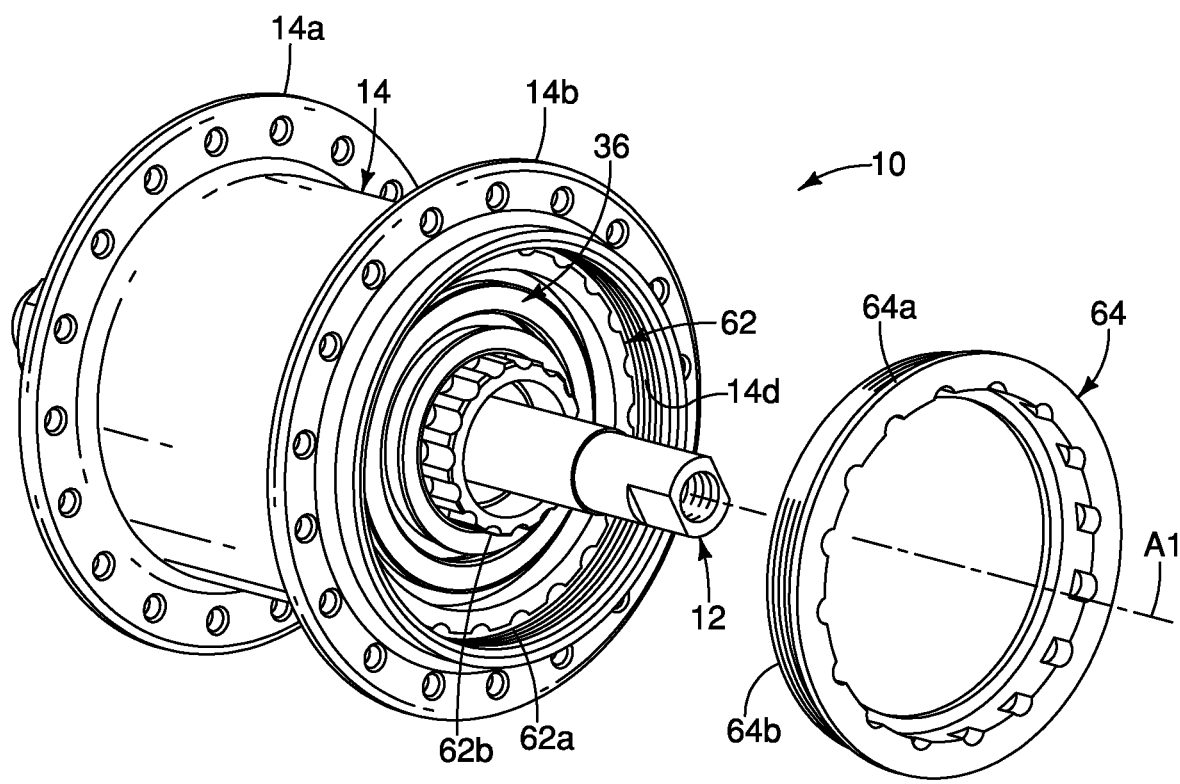
FIG. 9 is a partially exploded perspective view of the hub illustrated in FIGS. 2 to 5 after a retainer has been detached so that a coupling body can be removed.

As seen in FIGS. 4 and 7, the hub 10 further comprises a fixing member 60. Basically, the fixing member 60 retains the inner body 52 to the hub body 14. In particular, the hub 10 further comprises a coupling body 62. The coupling body 62 is coupled to the hub body 14. The coupling body 62 is non-rotatably coupled to the hub body 14, and the fixing member 60 attaches the inner body 52 to the coupling body 62. In this way, the inner body 52 is non-rotatably coupled to the hub body 14. Here, in the illustrated embodiment, the hub 10 further comprises a retainer 64 that is removably coupled to the hub body 14. The retainer 64 retains the coupling body 62 to the hub body 14. Thus, the inner body 52 is coupled to the hub body 14 via the coupling body 62 to rotate therewith. In other words, the hub body 14, the inner body 52 and the coupling body 62 are configured to rotate together. Thus, an input torque to the outer body 50 of the sprocket support structure 18 is transmitted to the hub body 14 via the inner body 52 and the coupling body 62.

Basically, the fixing member 60 is a tubular member having a first end portion 60a and a second end portion 60b. The first end portion 60a abuts the inner body 52. The second end portion 60b is coupled to the coupling body 62. More specifically, the second end portion 60b has an external thread 60b1 for attaching the coupling body 62 to the fixing member 60. The coupling body 62 retains the internal body 52 in the axial direction. The coupling body 62 prevents the internal body 52 from moving toward the second end portion 60b of the fixing member 60. In this way, the inner body 52 is axially retained between the coupling body 62 and a contact surface 60a1 of the fixing member 60. Here, a washer 66 is provided between the inner body 52 and the coupling body 62. Preferably, the fixing member 60 has an annular inner surface 60c. To attach the fixing member 60 to the coupling body 62, the fixing member 60 has a tool engagement portion 60d. Here, the fixing annular inner surface 60c includes the tool engagement portion 60d. Thus, the fixing member 60 constitutes a tubular fixing bolt. The external thread 60b1 of the fixing member 60 is screwed into the internal thread 62b1 of the coupling body 62.

The coupling body 62 will now be discussed in more detail. The coupling body 62 includes an outer peripheral portion 62a and an inner peripheral portion 62b. The outer peripheral portion 62a is coupled to the hub body 14, and the inner peripheral portion 62b is positioned radially inward of the outer peripheral portion 62a with respect to a radial direction of the center axis A1. Here, the outer peripheral portion 62a of the coupling body 62 includes a first coupling structure 62a1 having at least one of a spline and a groove. Preferably, as in the illustrated embodiment, the first coupling structure 62a1 has a plurality of the splines and a plurality of the grooves alternating in the circumferential direction. The hub body 14 includes a second coupling structure 14c having at least one of a spline and a groove. Preferably, as in the illustrated embodiment, the second coupling structure 14c has a plurality of the splines and a plurality of the grooves alternating in the circumferential direction. In this way, the first coupling structure 62a1 mates with the second coupling structure 14c to non-rotatably couple the coupling body 62 to the hub body 14.

With the coupling body 62 non-rotatably coupled to the hub body 14, the coupling body 62 is disposed between the rotation detection sensor 38 and the detected part 36. More specifically, the coupling body 62 is disposed between the magnetic sensor 38a and the detected part 36. The coupling body 62 is at least partially made of a non-magnetic material or has an opening. For examples, the non-magnetic material include austenitic stainless steel, high manganese steel, high nickel alloy, aluminum, and copper. Non-magnetic materials allow lines of magnetic force to pass through. Here, as seen in FIG. 5, the coupling body 62 is made of a non-magnetic material such as a hard resin material and aluminum alloys. Thus, the magnetic force of the detected part 36 passes through the coupling body 62 and reaches the rotation detection sensor 38.

As mentioned above, the fixing member 60 attaches the inner body 52 to the coupling body 62. In particular, the second end portion 60b is coupled to the inner peripheral portion 62b of the coupling body 62. In this way, the inner body 52 is axially retained between to the inner peripheral portion 62b of the coupling body 62 and the contact surface 60a1 of the fixing member 60.

As mentioned above, the retainer 64 is removably coupled to the hub body 14 to retain the coupling body 62 to the hub body 14. Here, the retainer 64 has an external thread 64a that is screwed into an internal thread 14d of the hub body 14. The retainer 64 has a contact surface 64b that contacts the outer peripheral portion 62a of the coupling body 62 to retain the coupling body 62 to the hub body 14. On the other hand, the inner peripheral portion 62b of the coupling body 62 is threadedly connected to the fixing member 60. In particular, the inner peripheral portion 62b of the coupling body 62 has an internal thread 62b1 that is threadedly engaged with the external thread 60b1 of the fixing member 60. In this way, the fixing member 60 is attached to the inner peripheral portion 62b of the coupling body 62. Thus, the coupling body 62 and the retainer 64 are coupled to the hub body 14 to rotate therewith.

Here, the inner body 52 includes a third coupling structure 52a having at least one of a spline and a groove. Preferably, as in the illustrated embodiment, the third coupling structure 52a has a plurality of the splines and a plurality of the grooves alternating in the circumferential direction. The coupling body 62 includes a fourth coupling structure 62b2 having at least one of a spline and a groove. Preferably, as in the illustrated embodiment, the fourth coupling structure 62b2 has a plurality of the splines and a plurality of the grooves alternating in the circumferential direction. In this way, the third coupling structure 52a mates with the fourth coupling structure 62b2 to non-rotatably couple the inner body 52 to the coupling body 62.

Figure 10:
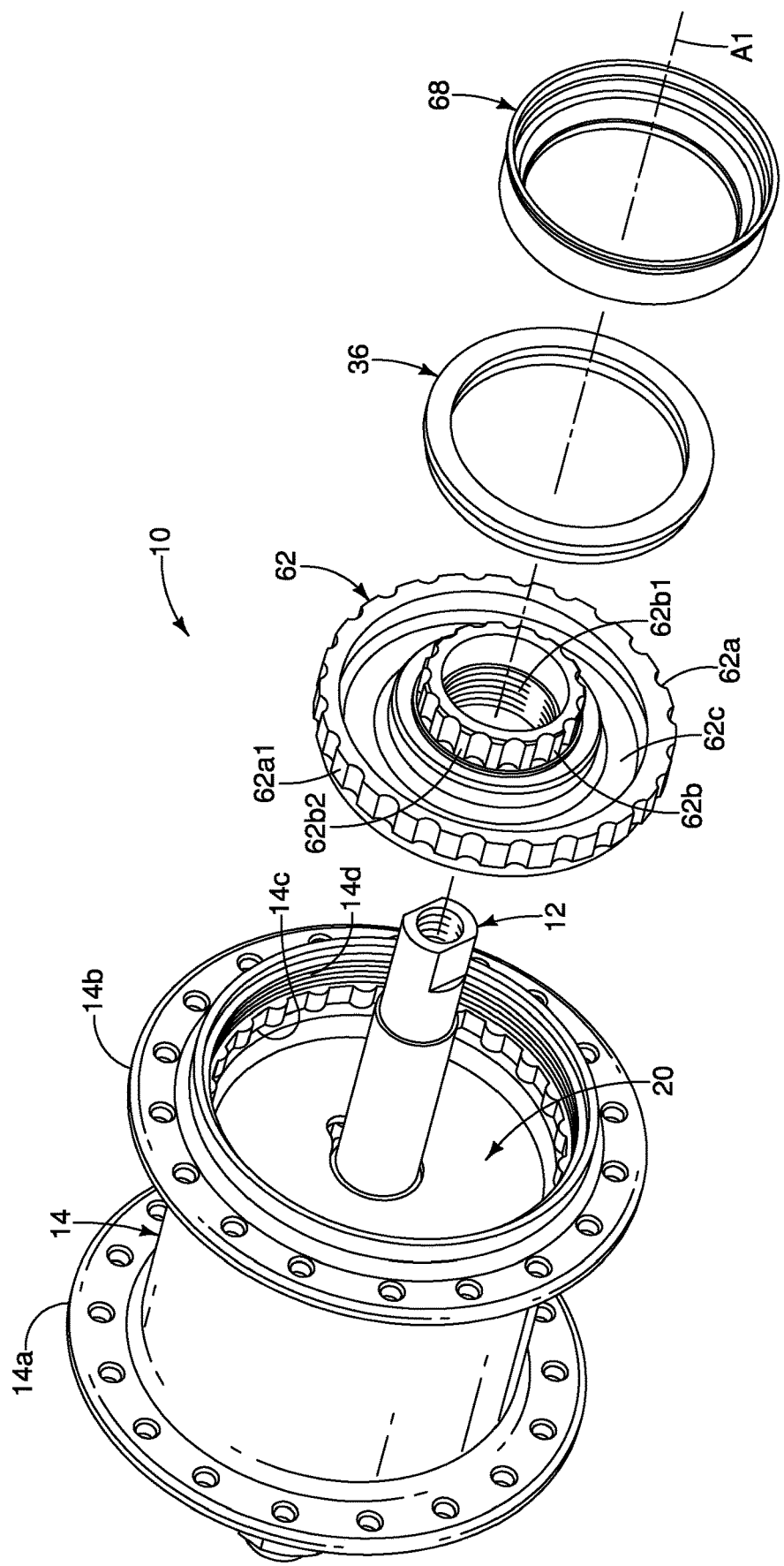
FIG. 10 is a partially exploded perspective view of the hub illustrated in FIGS. 2 to 5 after the coupling body has been detached.
Figure 11:
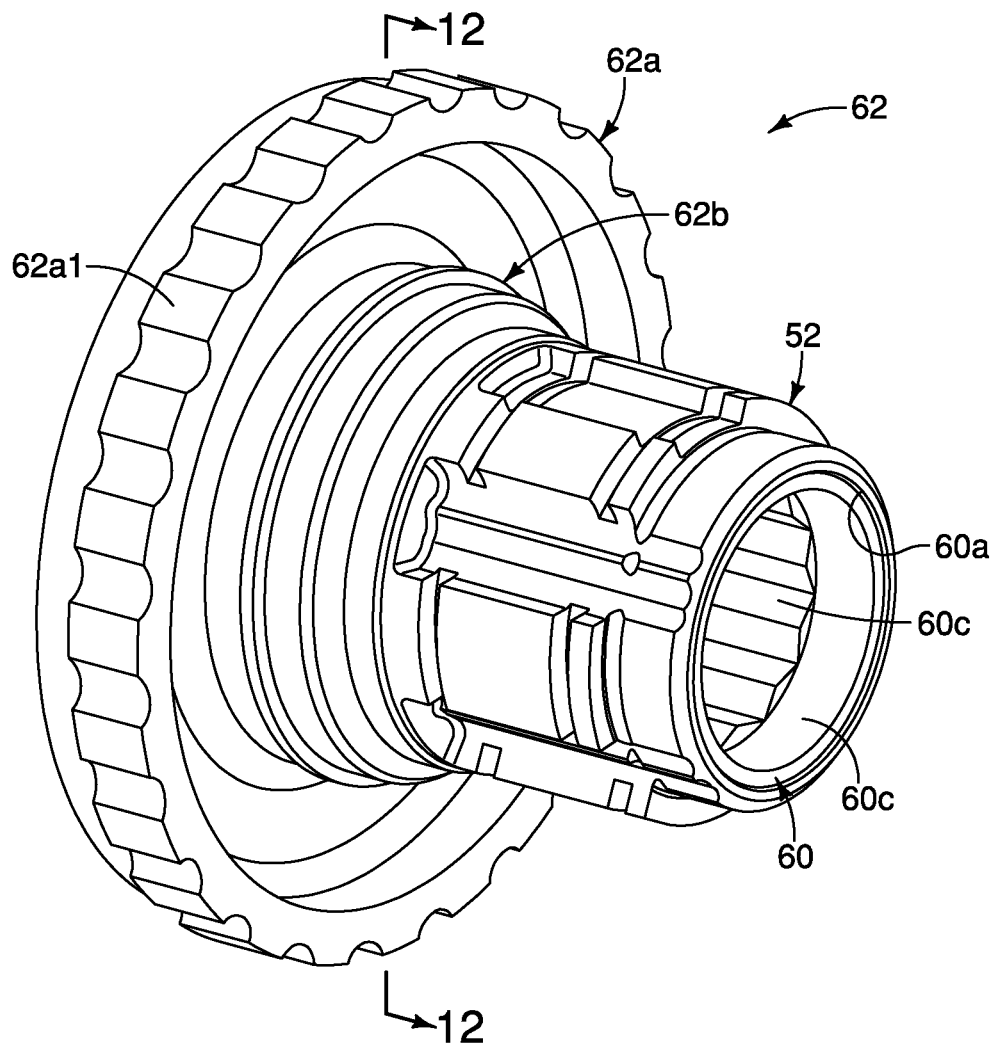
FIG. 11 is a perspective view of the inner body of the sprocket support structure attached to the coupling body by the fixing member.
Figure 12:
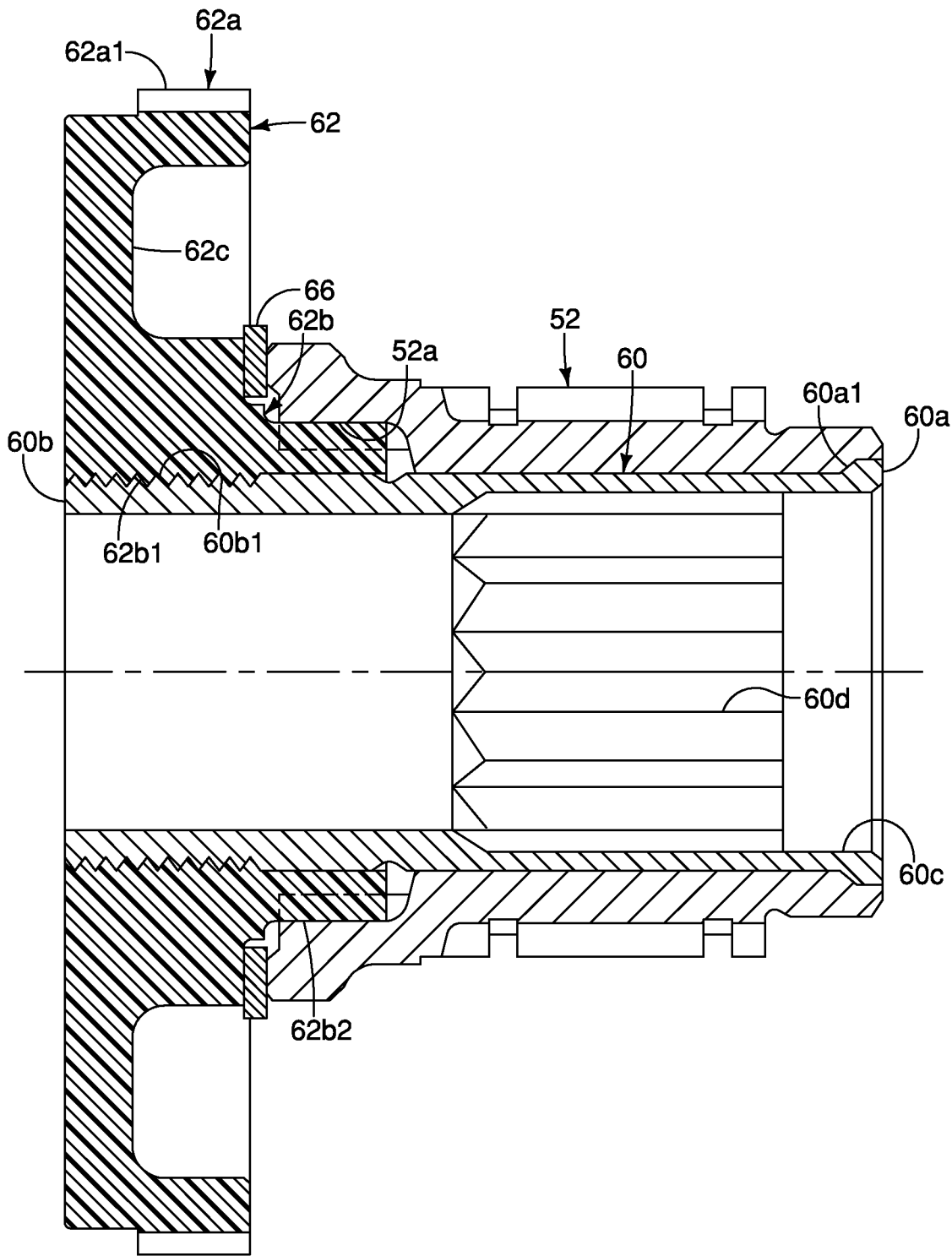
FIG. 12 is a longitudinal cross-sectional view of the inner body attached to the coupling body by the fixing member as seen along section line 12-12 of FIG. 11.
Figure 13:
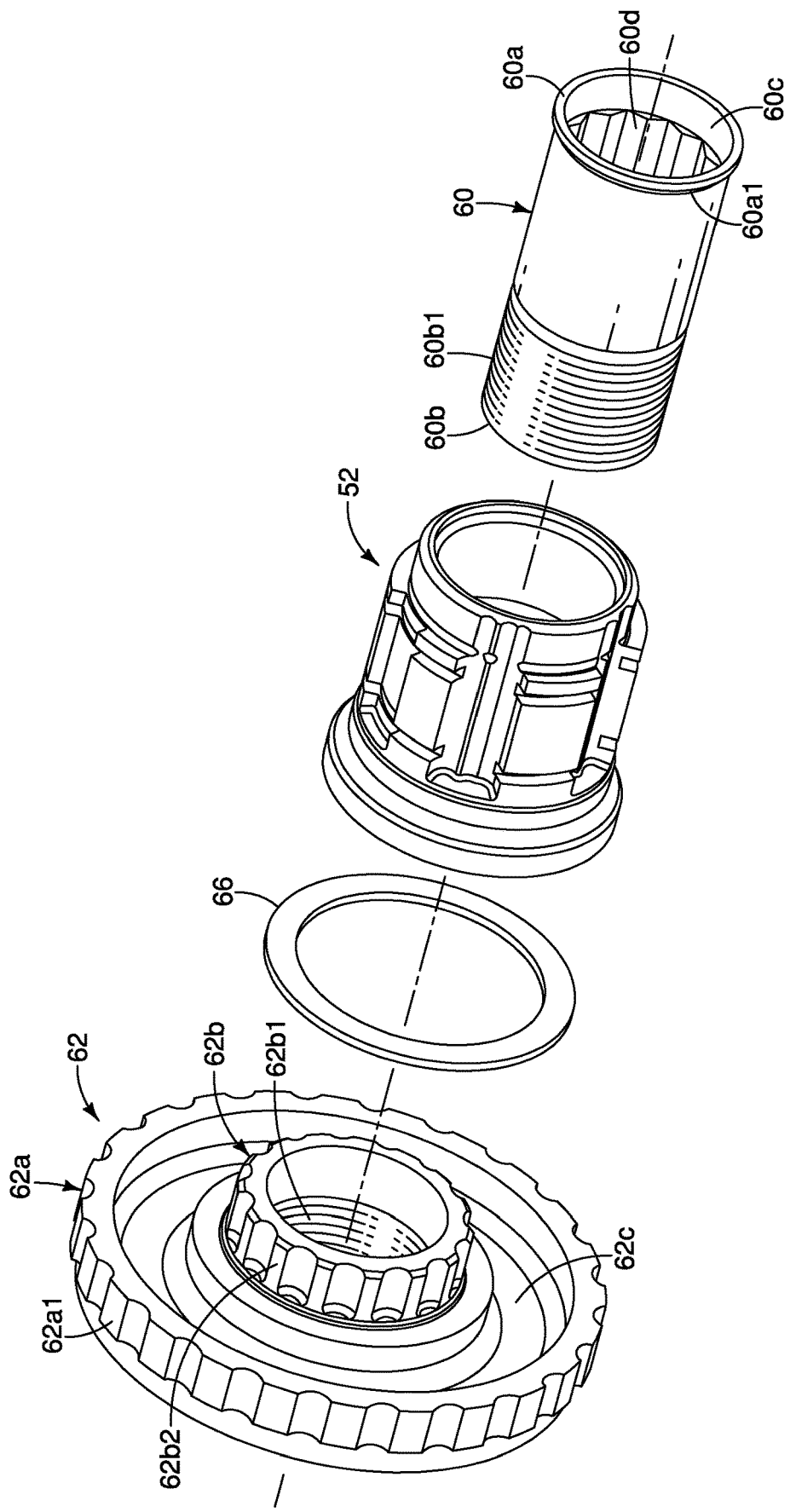
FIG. 13 is an exploded perspective view of the inner body, the coupling body and the fixing member of the hub illustrated in FIGS. 2 to 5.
Figure 14:
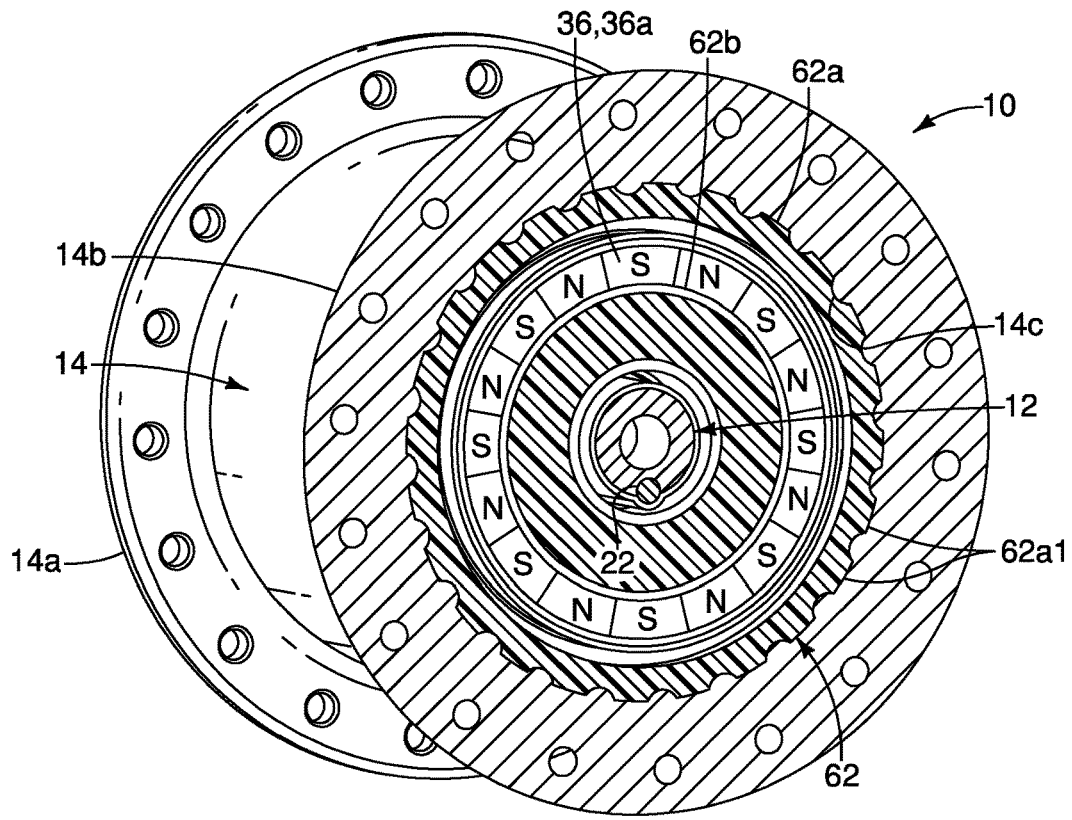
FIG. 14 is a transverse view of the hub illustrated in FIGS. 2 to 5 as seen along section line 14-14 of FIG. 3 to show connection between the coupling body and the hub body.
Figure 15:
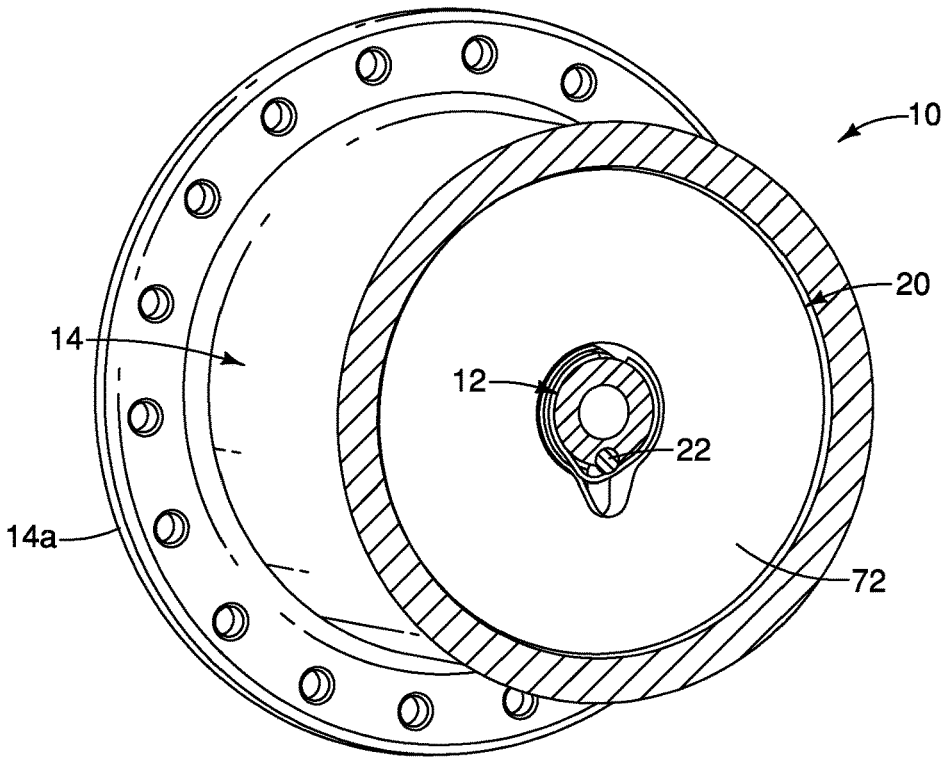
FIG. 15 is a perspective view of the hub illustrated in FIGS. 2 to 5 as seen along section line 15-15 of FIG. 3 to show the electrical unit disposed in the hub body.
Figure 16:
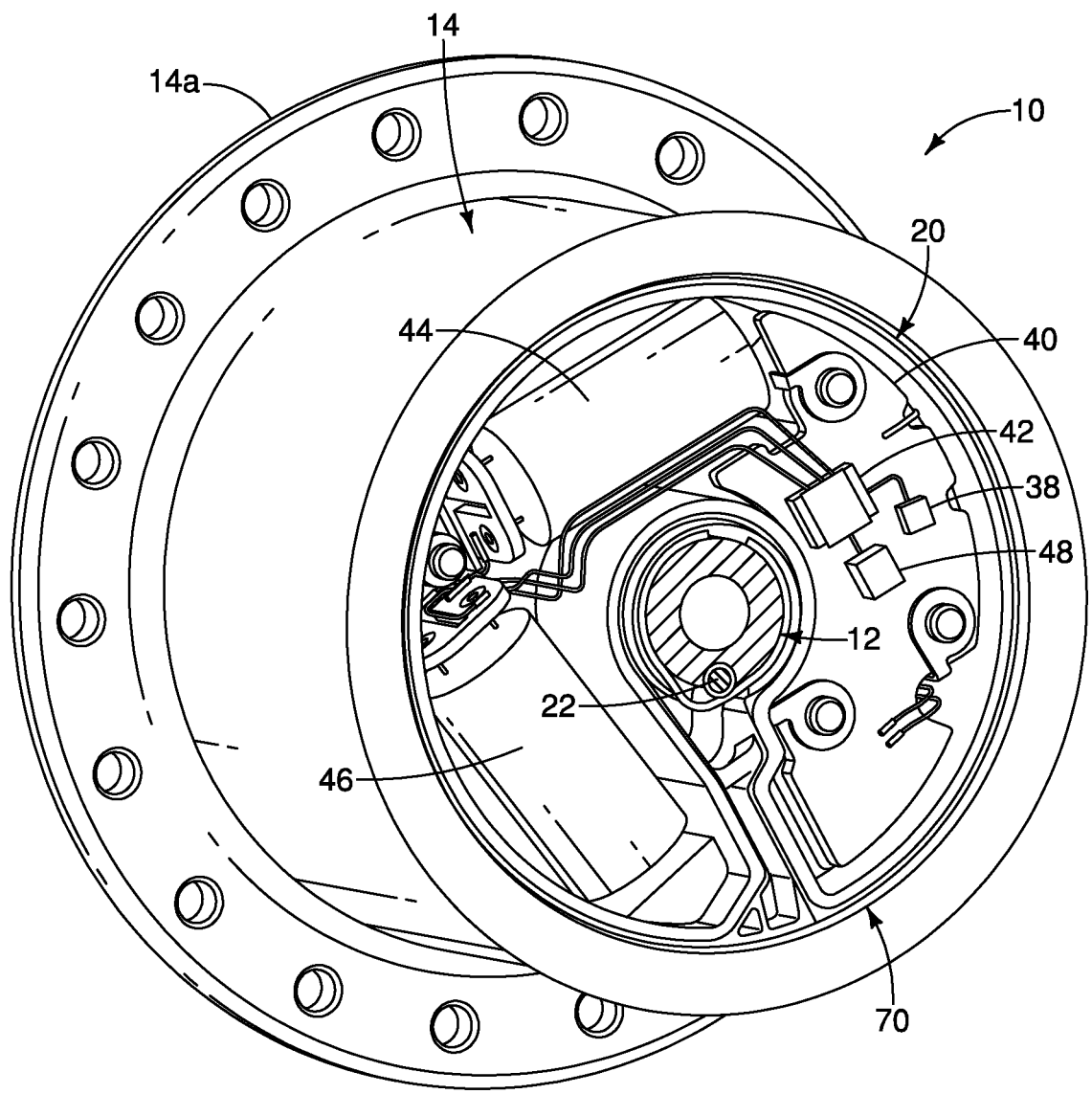
FIG. 16 is a perspective view of the hub illustrated in FIGS. 2 to 5 as seen along section line 16-16 of FIG. 3 to show an electric component inside the hub.
Figure 17:
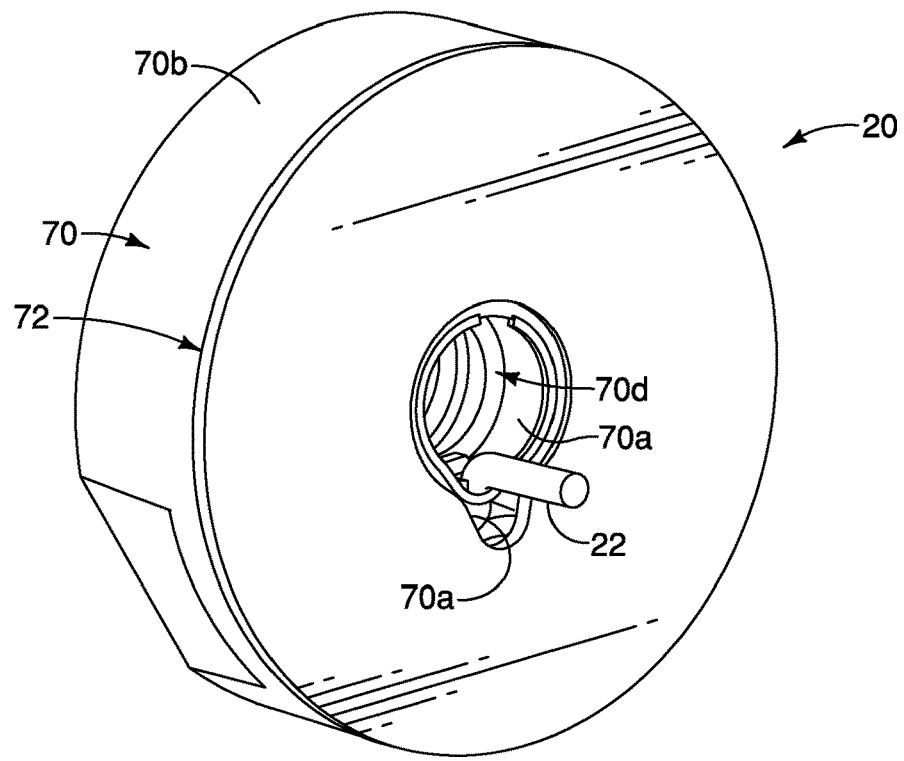
FIG. 17 is a first side perspective view of the electrical unit of the hub illustrated in FIGS. 2 to 5.
Figure 18:
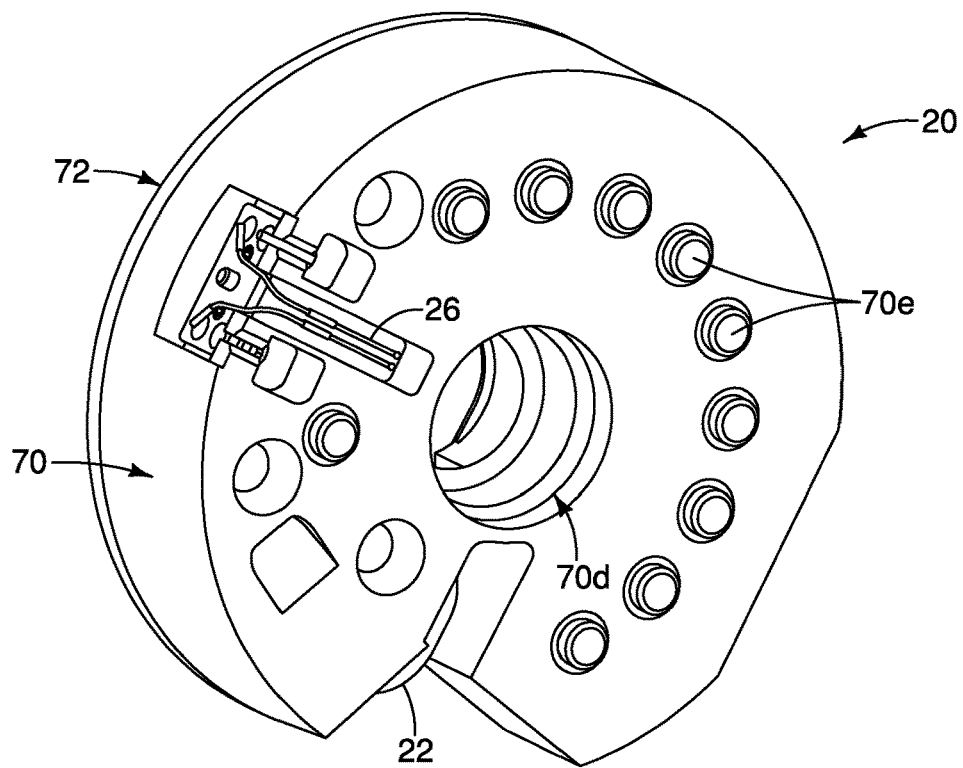
FIG. 18 is a second side perspective view of the electrical unit illustrated in FIG. 17 of the hub illustrated in FIGS. 2 to 5.
Figure 19:
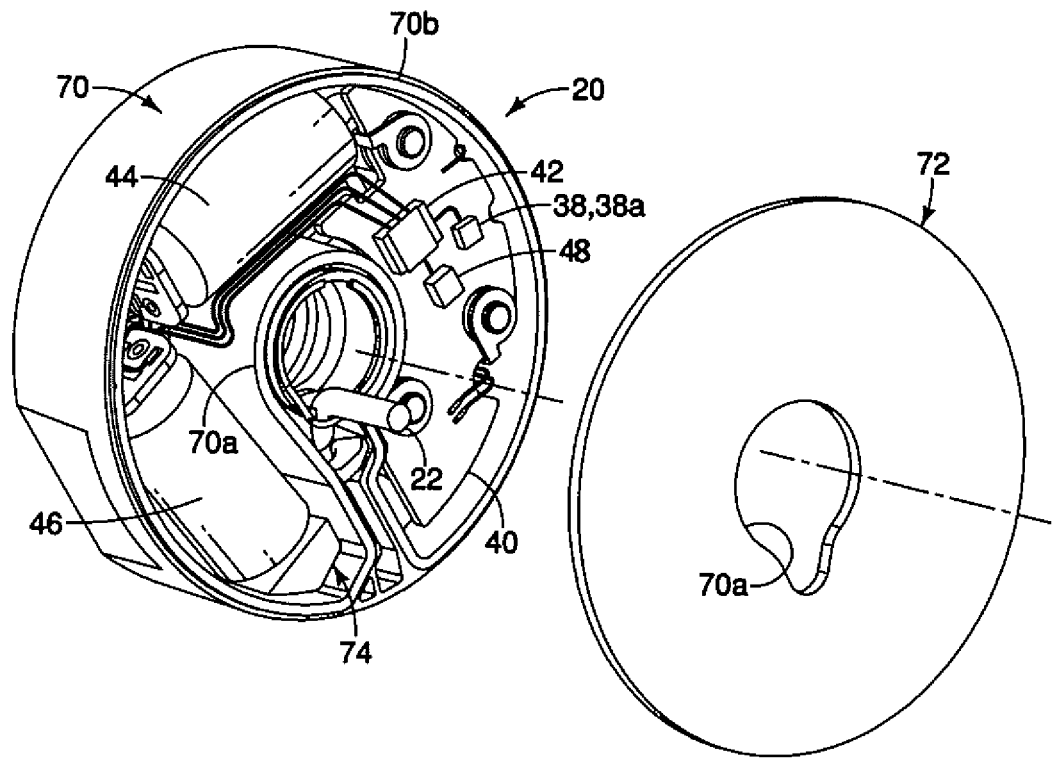
FIG. 19 is a partially exploded perspective view of the electrical unit illustrated in FIGS. 17 and 18 of the hub illustrated in FIGS. 2 to 5.
Figure 20:
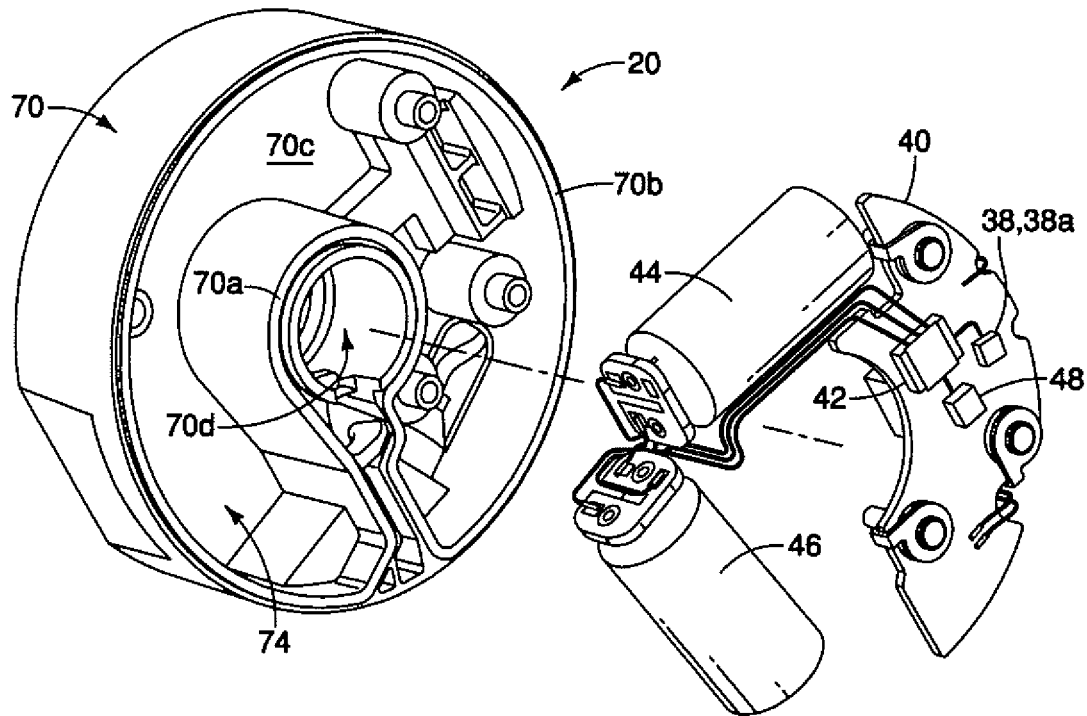
FIG. 20 is a partially exploded perspective view of the electrical unit illustrated in FIGS. 17 to 19 of the hub illustrated in FIGS. 2 to 5.

Referring back to FIGS. 5, 10 and 14, the coupling body 62 has an annular recess 62c that accommodates the detected part 36. The detected part 36 includes the magnet 36a. As seen in FIG. 5, the magnet 36a is non-rotatably coupled to the outer body 50 by a support ring 68. The support ring 68 is fixed to the outer body 50 such as by a press-fit, a thread connection, an adhesive, or other suitable fastening methods. As seen in FIG. 14, the magnet 36a is a ring shaped member that has alternating S-pole sections and N-pole sections.

Referring now to FIGS. 15 to 20, the electrical unit EU will now be discussed in more detail. Here, the electrical component 20 comprises a housing 70 and a lid 72. The housing 70 define an internal space 74 that has a donut shape. The lid 72 is attached (e.g., bonded) to the housing 70 to close the internal space 74 of the housing 70. Preferably, the housing 70 and a lid 72 are preferably made of a non-metallic material such as a resin material.

The housing 70 includes an inner peripheral portion 70a, an outer peripheral portion 70b and an end wall portion 70c. The inner peripheral portion 70a and the end wall portion 70c define a through opening 70d for receiving the hub axle 12. The lid 72 is a plate that has a center opening 72a for receiving the hub axle 12. The end wall portion 70c of the housing 70 includes a plurality of keying protrusions 70e. The keying protrusions 70e are configured to engage openings in a fixing plate 76 that is keyed to the groove 12d of the hub axle 12. The fixing plate 76 has a plate shape. The fixing plate 76 includes a plurality of openings corresponding to the plurality of protrusions 70e. In this way, the electrical unit EU is prevented from rotating relative to the hub axle 12. The fixing plate 76 is arranged between the electric power generator 24 and the electrical unit EU in the axial direction.

Here, the housing 70 supports the circuit board 40 which in turn supports rotation detection sensor 38, the electronic controller 42 and the data storage device 48. The first electric power storage device 44 and the second electric power storage device 46 are supported to the end wall portion 70c. For example, the first electric power storage device 44 and the second electric power storage device 46 are bonded to the end wall portion 70c.

Figure 21:
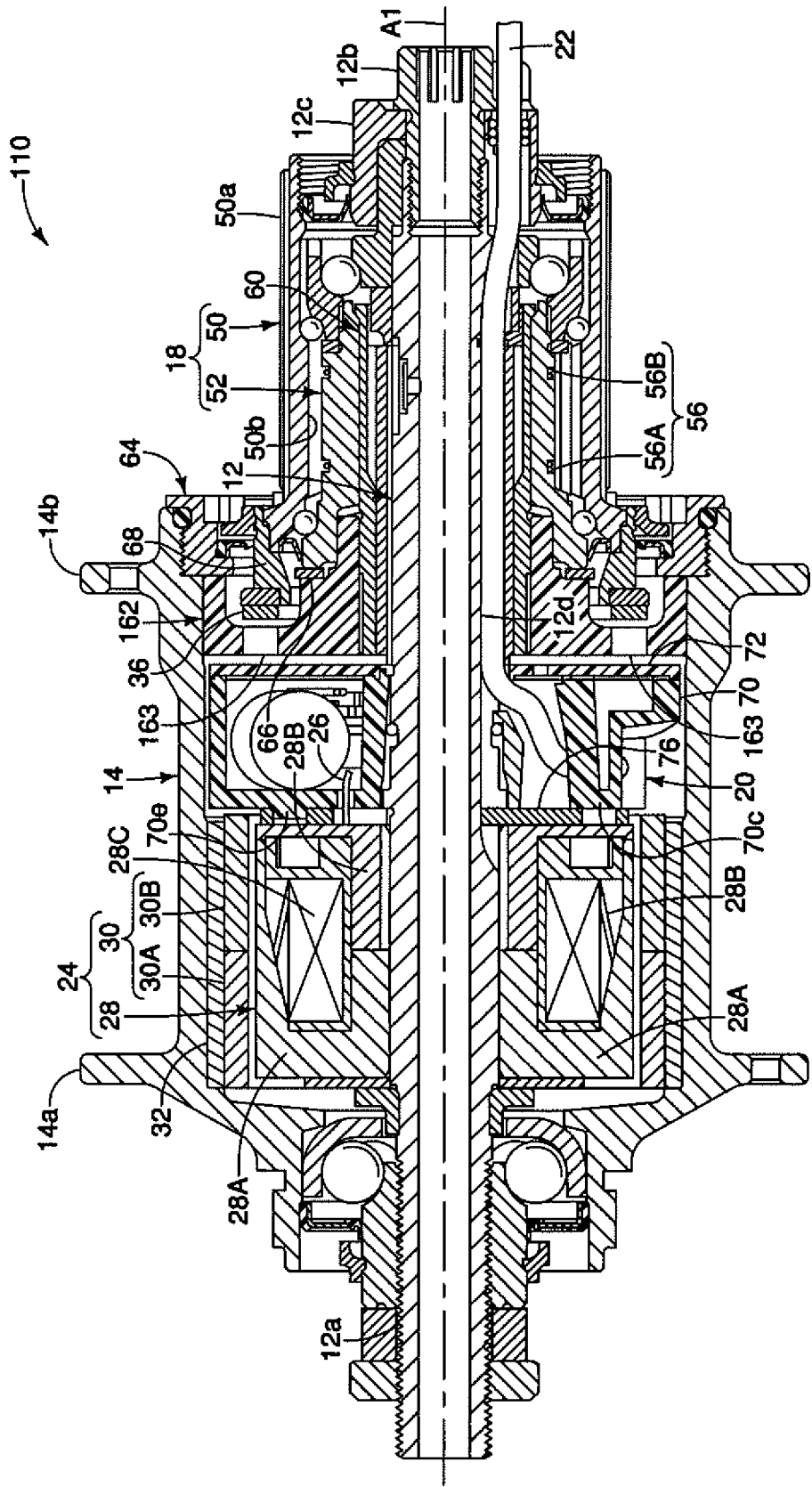
FIG. 21 is a longitudinal cross-sectional view of a hub in accordance with a second embodiment.

Referring now to FIG. 21, a hub 110 is illustrated in accordance with a second embodiment. Here, the only difference between the hub 10 and the hub 110 is the coupling body. Here, the hub 110 includes a coupling body 162 that is identical to the coupling body 62 of the hub 10, except that the coupling body 162 includes a plurality of opening 163. Thus, the coupling body 162 can be made of a magnetically permeable material. Especially, the coupling body 162 can be made of a ferromagnetic material. The ferromagnetic materials have a shielding effect. The ferromagnetic materials include, for example, nickel, cobalt and iron. The coupling body 162 rotates around the hub axle 12. Therefore, it is preferable that the plurality of openings 163 are arranged in the circumferential direction with respect to the center axis A1. Thus, the magnetic force of the detected part 36 is cut off at the coupling body 162, but it passes through the plurality of openings 163 and reaches the rotation detection sensor 38. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 22:
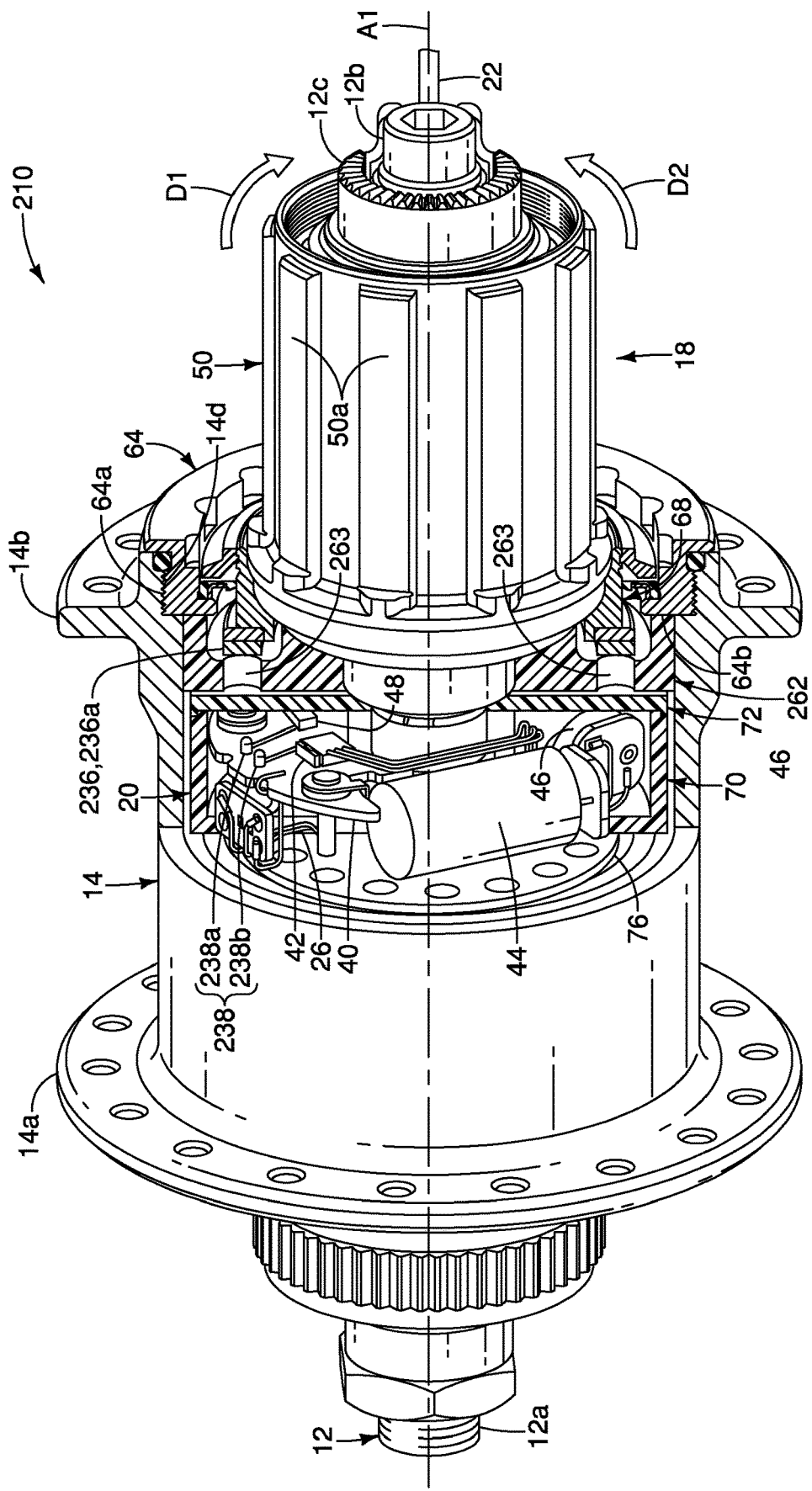
FIG. 22 is a longitudinal cross-sectional view of a hub in accordance with a third embodiment.

Referring now to FIG. 22, a hub 210 is illustrated in accordance with a third embodiment. Here, the only differences between the hub 10 and the hub 210 are the coupling body, detected part and the rotation detection sensor. Here, the hub 210 includes a detected part 236 and a rotation detection sensor 238. The detected part 236 includes a reflective member 236a. For example, the reflective member 236a can be a reflective metallic washer or a non-metallic washer that has a reflective coating. The rotation detection sensor 238 that includes an optical sensor 238a. The rotation detection sensor 238 further includes a light source 238b (e.g., an LED) that outputs light which is detected by the optical sensor 238a.

Here, in the third embodiment, the hub 210 includes a coupling body 262 that is at least partially made of a transparent material or having an opening. Here, the coupling body 262 includes a plurality of openings 263. These openings 263 can be provided with a transparent material or can be free of any material. In either case, the coupling body 62 is disposed between the optical sensor and the detected part 236. In any case, the openings 263 are sized and positioned such that light emitted by the light source 238b passes through the openings 263 and is reflected back through the openings 263 by the reflective member 236a to be detected by the optical sensor 238a. The coupling body 262 rotates around the hub axle 12. Therefore, it is preferable that the plurality of openings 263 are arranged in the circumferential direction with respect to the center axis A1. Thus, even if the coupling body 262 does not allow light to pass through, the light emitted from the rotation detection sensor 238 passes through the plurality of opening 263, is reflected by the detected part 236, and returns to the rotation detection sensor 238.

In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle field (e.g., bicycle) in an upright, riding position and equipped with the hub. Accordingly, these directional terms, as utilized to describe the hub should be interpreted relative to a human-powered vehicle field (e.g., bicycle) in an upright riding position on a horizontal surface and that is equipped with the hub. The terms "left" and "right" are used to indicate the "right" when referencing from the right side as viewed from the rear of the human-powered vehicle field (e.g., bicycle), and the "left" when referencing from the left side as viewed from the rear of the human-powered vehicle field (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used disclosure means "either one or both of".

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hub for a human-powered vehicle, the hub comprising:
    a hub axle having a center axis;
    a hub body rotatably disposed around the center axis;
    a sprocket support structure rotatably disposed around the center axis to transmit a driving force to the hub body while rotating in a driving rotational direction around the center axis;
    a detected part provided to the sprocket support structure; and
    an electric component disposed in the hub body between the hub axle and the hub body in the radial direction with respect to the center axis, the electrical component comprising
    a housing defining an internal space,
    a circuit board accommodated in the internal space, and
    a rotation detection sensor disposed in the internal space and configured to detect the detected part to detect rotation of the sprocket support structure around the center axis and being disposed in the hub body.

2. The hub according to claim 1, wherein
the rotation detection sensor includes a magnetic sensor, and
the detected part includes a magnet.

3. The hub according to claim 2, further comprising
a coupling body coupled to the hub body and disposed between the magnetic sensor and the detected part, the coupling body being at least partially made of a non-magnetic material or having an opening.

4. The hub according to claim 1, wherein
the rotation detection sensor includes an optical sensor, and
the detected part includes a reflective member.

5. The hub according to claim 4, further comprising
a coupling body coupled to the hub body and disposed between the optical sensor and the detected part, the coupling body being at least partially made of a transparent material or having an opening.

6. The hub according to claim 1, wherein
the sprocket support structure includes an outer body configured to support at least one sprocket and an inner body coupled to the hub body to rotate therewith, and
the outer body is coupled to the inner body to rotate together in the driving rotational direction around the center axis, and is configured to rotate relative to the inner body in a non-driving rotational direction around the center axis.

7. The hub according to claim 6, further comprising
a coupling body coupled to the hub body and the inner body, and disposed between the rotation detection sensor and the detected part.

8. The hub according to claim 1, wherein
the circuit board is provided in the hub body, and
the rotation detection sensor is provided on the circuit board.

9. The hub according to claim 1, wherein
the electrical component further comprises an electronic controller provided on the circuit board and configured to receive a detection signal from the rotation detection sensor.

10. The hub according to claim 1, further comprising
an electrical cable electrically connected to the electric component and passing axially through a space between the sprocket support structure and the hub axle.

11. The hub according to claim 10, wherein
the hub axle includes a groove, and
the electric cable is accommodated in the groove.

12. The hub according to claim 1, further comprising
an electric power generator disposed in the hub body, and configured to generate electric power by rotation of the hub body, and
the electric component being electrically connected to the electric power generator.

13. The hub according to claim 1, further comprising
an electric power generator disposed in the hub body, and configured to generate electric power by rotation of the hub body.

14. The hub according to claim 13, further comprising
an electrical cable electrically connected to the electric power generator and passing axially through a space between the sprocket support structure and the hub axle.

15. The hub according to claim 14, wherein
the hub axle includes a groove, and
the electric cable is accommodated in the groove.

16. The hub according to claim 1, wherein
the housing is provided inside the hub body.

17. A hub for a human-powered vehicle, the hub comprising:
a hub axle having a center axis;
a hub body rotatably disposed around the center axis;
a coupling body including an outer peripheral portion coupled to the hub body and an inner peripheral portion positioned radially inward of the outer peripheral portion with respect to a radial direction of the center axis;
a sprocket support structure rotatably disposed around the center axis to transmit a driving force to the hub body, the sprocket support structure including
an outer body configured to support at least one sprocket, and
an inner body coupled to the hub body via the coupling body to rotate therewith, the outer body being coupled to the inner body to rotate together in the driving rotational direction around the center axis, and the outer body being configured to rotate relative to the inner body in a non-driving rotational direction around the center axis;
a fixing member attached to the inner peripheral portion of the coupling body and attaching the inner body to the coupling body; and
a retainer removably coupled to the hub body, and retaining the coupling body to the hub body.

18. The hub according to claim 17, wherein
the fixing member is a tubular member having a first end portion abutting the inner body, and a second end portion coupled to the inner peripheral portion of the coupling body.

19. The hub according to claim 17, wherein
the inner peripheral portion of the coupling body is threadedly connected to the fixing member.

20. The hub according to claim 17, wherein
the outer peripheral portion of the coupling body includes a first coupling structure having at least one of a spline and a groove,
the hub body includes a second coupling structure having at least one of a spline and a groove, and
the first coupling structure mates with the second coupling structure to non-rotatably couple the coupling body to the hub body.

21. The hub according to claim 17, wherein
the inner body includes a third coupling structure having at least one of a spline and a groove,
the coupling body includes a fourth coupling structure having at least one of a spline and a groove, and
the third coupling structure mates with the fourth coupling structure to non-rotatably couple the inner body to the coupling body.

22. The hub according to claim 17, wherein
the inner body is axially retained between the coupling body and a contact surface of the fixing member.

23. The hub according to claim 17, wherein
the fixing member has a tool engagement portion.

24. The hub according to claim 23, wherein
the fixing member has an annular inner surface that includes the tool engagement portion.

25. The hub according to claim 17, further comprising
an electric component disposed in the hub body between the hub axle and the hub body in the radial direction with respect to the center axis, and
an electrical cable electrically connected to the electric component and passing axially through a space between the fixing member and the hub axle.

26. The hub according to claim 25, wherein
the hub axle includes a groove, and
the electric cable is accommodated in the groove.

27. The hub according to claim 25, further comprising
an electric power generator disposed in the hub body, and configured to generate electric power by rotation of the hub body, and
the electric component electrically connected to the electric power generator.

28. The hub according to claim 17, further comprising
an electric power generator disposed in the hub body, and configured to generate electric power by rotation of the hub body.

29. The hub according to claim 28, further comprising
an electrical cable electrically connected to the electric power generator and passing axially through a space between the fixing member and the hub axle.

30. The hub according to claim 29, wherein
the hub axle includes a groove, and
the electric cable is accommodated in the groove.

* * * * *